US010427796B2

(12) United States Patent
Carden et al.

(10) Patent No.: US 10,427,796 B2
(45) Date of Patent: Oct. 1, 2019

(54) AIR DISTRIBUTION SYSTEM AND METHOD FOR AN AIR CONDITIONING SYSTEM IN AN AIR VEHICLE

(71) Applicant: The Boeing Company, Chicago, IL (US)

(72) Inventors: Annika E. Carden, Mt. Pleasant, SC (US); Royal E. Boggs, North Charleston, SC (US); Brian D. Hlavka, Mukilteo, WA (US); Sidney D. Shell, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 354 days.

(21) Appl. No.: 15/476,491

(22) Filed: Mar. 31, 2017

(65) Prior Publication Data
US 2018/0281975 A1      Oct. 4, 2018

(51) Int. Cl.
*B64D 13/08* (2006.01)
*B64D 13/06* (2006.01)
*B64D 13/02* (2006.01)

(52) U.S. Cl.
CPC ............. *B64D 13/08* (2013.01); *B64D 13/02* (2013.01); *B64D 13/06* (2013.01); *B64D 2013/0625* (2013.01); *B64D 2013/0688* (2013.01); *Y02T 50/44* (2013.01)

(58) Field of Classification Search
CPC ................................ B64D 13/08; B64D 13/02
USPC .......................................................... 454/76
See application file for complete search history.

(56) References Cited

U.S. PATENT DOCUMENTS

| 4,490,989 | A | * | 1/1985 | Keen | B64D 13/08 165/41 |
| 5,253,484 | A | * | 10/1993 | Corman | B64D 13/00 454/76 |
| 6,189,831 | B1 | * | 2/2001 | Asai | B64D 11/0023 244/118.5 |
| 6,619,589 | B2 | * | 9/2003 | Brasseur | B60H 1/00371 244/118.5 |
| 7,789,346 | B2 | * | 9/2010 | Horstman | B64D 13/06 244/118.5 |

(Continued)

OTHER PUBLICATIONS

European Patent Office Extended European Search Report, dated Aug. 16, 2018, for counterpart foreign application No. EP 18154999.9, Applicant The Boeing Company, 8 pages.

*Primary Examiner* — Steven B McAllister
*Assistant Examiner* — Samantha A Probst

(57) ABSTRACT

An air distribution system and method for an air conditioning system in an air vehicle are provided. The air distribution system has lower lobe ducts below a cabin floor of a cabin of the air vehicle. Each lower lobe duct is in fluid communication with a mix manifold coupled to AC packs. The air distribution system further has sidewall riser ducts, outboard manifold ducts, a recirculation air duct, and either recirculation downer ducts, or branch recirculation ducts coupled to the recirculation air duct. The air distribution system has a conditioned air flow, distributed to either the lower lobe ducts, or the lower lobe ducts and then the sidewall riser ducts; has a recirculated air flow, distributed to either the recirculation downer ducts or branch recirculation ducts; and has a mixed air flow distributed to the outboard manifold ducts, and into the cabin.

21 Claims, 10 Drawing Sheets

(56) References Cited

U.S. PATENT DOCUMENTS

| | | | | |
|---|---|---|---|---|
| 7,837,541 B2* | 11/2010 | Gray | ................. | B64D 13/04 |
| | | | | 244/118.5 |
| 8,336,821 B2* | 12/2012 | Shell | ................. | B64D 13/06 |
| | | | | 165/108 |
| 2001/0042612 A1* | 11/2001 | Hasenoehrl | ........ | B64D 11/0015 |
| | | | | 165/80.3 |
| 2002/0056286 A1 | 5/2002 | Ng et al. | | |
| 2008/0064316 A1* | 3/2008 | Ng | ................. | A62C 3/08 |
| | | | | 454/76 |
| 2008/0099606 A1 | 5/2008 | Horstman et al. | | |
| 2008/0290217 A1* | 11/2008 | Ghoreishi | ................. | B64C 1/18 |
| | | | | 244/129.4 |
| 2009/0227195 A1 | 9/2009 | Buelow et al. | | |
| 2009/0311951 A1 | 12/2009 | Walkinshaw | | |
| 2011/0107777 A1 | 5/2011 | Atkey et al. | | |
| 2012/0255715 A1* | 10/2012 | Army | ................. | B64D 13/06 |
| | | | | 165/148 |
| 2013/0068421 A1* | 3/2013 | Army | ................. | F28F 11/00 |
| | | | | 165/70 |
| 2015/0246729 A1 | 9/2015 | Ng et al. | | |
| 2015/0266584 A1* | 9/2015 | Koemer | ................. | B64D 13/00 |
| | | | | 454/76 |
| 2015/0274304 A1* | 10/2015 | Gray | ................. | B64D 45/00 |
| | | | | 244/119 |
| 2016/0046380 A1* | 2/2016 | Ng | ................. | B64D 13/02 |
| | | | | 454/76 |
| 2016/0101869 A1 | 4/2016 | Markwart et al. | | |
| 2016/0114892 A1* | 4/2016 | Moran | ................. | B64D 11/04 |
| | | | | 244/118.5 |
| 2016/0377316 A1 | 12/2016 | Ellsworth et al. | | |
| 2017/0297716 A1* | 10/2017 | Moran | ................. | B64D 11/04 |
| 2018/0099755 A1* | 4/2018 | Borumand | ............. | B64D 13/08 |
| 2018/0127098 A1* | 5/2018 | Moran | ................. | B64D 11/0007 |

\* cited by examiner

AIR DISTRIBUTION SYSTEM AND METHOD FOR AN AIR CONDITIONING SYSTEM IN AN AIR VEHICLE

BACKGROUND

1) Field of the Disclosure

The disclosure relates generally to aircraft air conditioning systems, and more particularly, to air distribution systems and methods for aircraft air conditioning systems that redesign and simplify the architecture of the air distribution systems.

2) Description of Related Art

Air distribution systems for distributing an air flow, such as a conditioned outside air flow, or a conditioned outside air flow mixed with a recirculated air flow, from an aircraft air conditioning system to an aircraft cabin of a wide-body passenger aircraft, typically include a system frame architecture made up of numerous ducts and associated parts that are assembled over the ceiling of the aircraft cabin, under the floor of the aircraft cabin, and behind the walls of the aircraft cabin. The distribution of the air flow, such as the conditioned outside air flow, or the conditioned outside air flow mixed with the recirculated air flow, to the aircraft cabin is typically fixed by the system frame architecture or ducting design, and air flow balancing openings and valves, of the air distribution system.

Known air distribution systems and methods for wide-body passenger aircraft air conditioning systems exist. Such known air distribution systems and methods typically mix a conditioned outside air flow with a recirculated air flow at the crown or upper portion of the aircraft fuselage over the ceiling of the cabin, rather than under the cabin floor of the aircraft cabin. Such mixing of the conditioned outside air flow and the recirculated air flow at the crown of the aircraft may require the use of a complex system architecture, including complex overhead ducts and associated parts, such as crown mixing ducts or centerline ducts, crossover ducts, mufflers, and other associated parts. However, such complex ducts and associated parts may be heavy in weight, high in number, and costly to obtain and assemble. This, in turn, may result in increased weight of the aircraft and increased costs of labor and manufacturing the aircraft.

In addition, such known air distribution systems and methods typically require overhead installation and assembly of the complex ducts and associated parts in the crown of the aircraft. Such overhead installation and assembly may be conducted on a platform or on a ladder for long periods of time. This may result in increased risk for build ergonomics and safety.

Accordingly, what is needed is an improved air distribution system and method for an aircraft air conditioning system that reduce the number of ducts and associated parts needed, that reduce the weight and complexity of the system, that simplify the system architecture and build process, that improve build ergonomics and safety, and that provide other advantages over known air distribution systems and methods.

SUMMARY

This need for an improved air distribution system and method for an aircraft air conditioning system is satisfied. As discussed in the below detailed description, embodiments of such improved air distribution system and method for an aircraft air conditioning system may provide significant advantages over known air distribution systems and methods.

In one embodiment there is provided an air distribution system for an air conditioning system in an air vehicle. The air distribution system comprises a plurality of lower lobe ducts located below a cabin floor of a cabin of the air vehicle. Each of the plurality of lower lobe ducts is in fluid communication with a mix manifold coupled to one or more air conditioning (AC) packs of the air conditioning system in the air vehicle.

The air distribution system further comprises a plurality of sidewall riser ducts coupled to the plurality of lower lobe ducts, a pair of outboard manifold ducts, and a recirculation air duct located in a crown portion of the air distribution system above the cabin floor. The air distribution system further comprises one of, a plurality of recirculation downer ducts, or a plurality of branch recirculation ducts, coupled to the recirculation air duct.

The air distribution system further comprises a conditioned air flow, distributed from the one or more AC packs, through the mix manifold, and to one of, the plurality of lower lobe ducts, or the plurality of lower lobe ducts and then the plurality of sidewall riser ducts. The air distribution system further comprises a recirculated air flow, distributed from the recirculation air duct, to one of, the plurality of recirculation downer ducts, or the plurality of branch recirculation ducts.

The air distribution system further comprises a mixed air flow formed by mixing the conditioned air flow and the recirculated air flow. The mixed air flow is distributed to the pair of outboard manifold ducts, and into the cabin of the air vehicle.

In another embodiment there is provided an aircraft. The aircraft comprises a fuselage, at least one wing connected to the fuselage, and a cabin located within the fuselage, where the cabin has a cabin floor. The aircraft further comprises an environmental control system (ECS) coupled to the cabin. The ECS comprises an air conditioning system and an air distribution system. The air conditioning system has at least one or more air conditioning (AC) packs, an air cycle machine (ACM), and one or more heat exchangers.

The air distribution system comprises a plurality of lower lobe ducts located below the cabin floor. Each of the plurality of lower lobe ducts is in fluid communication with a mix manifold coupled to the one or more air conditioning (AC) packs.

The air distribution system further comprises a plurality of sidewall riser ducts coupled to the plurality of lower lobe ducts, a pair of outboard manifold ducts coupled to one of, the plurality of sidewall riser ducts, or a plurality of mixed air flow ducts, and a recirculation air duct located in a crown portion of the air distribution system above the cabin floor. The air distribution system further comprises one of, a plurality of recirculation downer ducts, or a plurality of branch recirculation ducts, coupled to the recirculation air duct.

The air distribution system further comprises a conditioned air flow, distributed from the one or more AC packs, through the mix manifold, and to one of, the plurality of lower lobe ducts, or the plurality of lower lobe ducts and then the plurality of sidewall riser ducts. The air distribution system further comprises a recirculated air flow, distributed from the recirculation air duct to one of, the plurality of recirculation downer ducts, or the plurality of branch recirculation ducts.

The air distribution system further comprises a mixed air flow formed by mixing the conditioned air flow and the recirculated air flow. The mixed air flow is distributed to the one or more outboard manifold ducts, and into the cabin of the aircraft.

In another embodiment there is provided a method for distributing air flows in an air vehicle. The method comprises the step of assembling an air distribution system for an air conditioning system in the air vehicle. The air distribution system distributes the air flows in the air vehicle.

The air distribution system comprises a plurality of lower lobe ducts located below a cabin floor of a cabin of the air vehicle. Each of the plurality of lower lobe ducts is in fluid communication with a mix manifold coupled to one or more air conditioning (AC) packs of the air conditioning system in the air vehicle.

The air distribution system further comprises a plurality of sidewall riser ducts coupled to the plurality of lower lobe ducts, a pair of outboard manifold ducts, and a recirculation air duct located in a crown portion of the air distribution system above the cabin floor. The air distribution system further comprises one of, a plurality of recirculation downer ducts, or a plurality of branch recirculation ducts, coupled to the recirculation air duct.

The method further comprises the step of distributing a conditioned air flow, from the one or more AC packs, through the mix manifold, and to one of, the plurality of lower lobe ducts, or the plurality of lower lobe ducts and then the plurality of sidewall riser ducts. The method further comprises the step of distributing a recirculated air flow, from the recirculation air duct to one of, the plurality of recirculation downer ducts, or the plurality of branch recirculation ducts.

The method further comprises the step of mixing the conditioned air flow and the recirculated air flow to form a mixed air flow. The method further comprises the step of distributing the mixed air flow to the pair of outboard manifold ducts, and into the cabin of the air vehicle.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
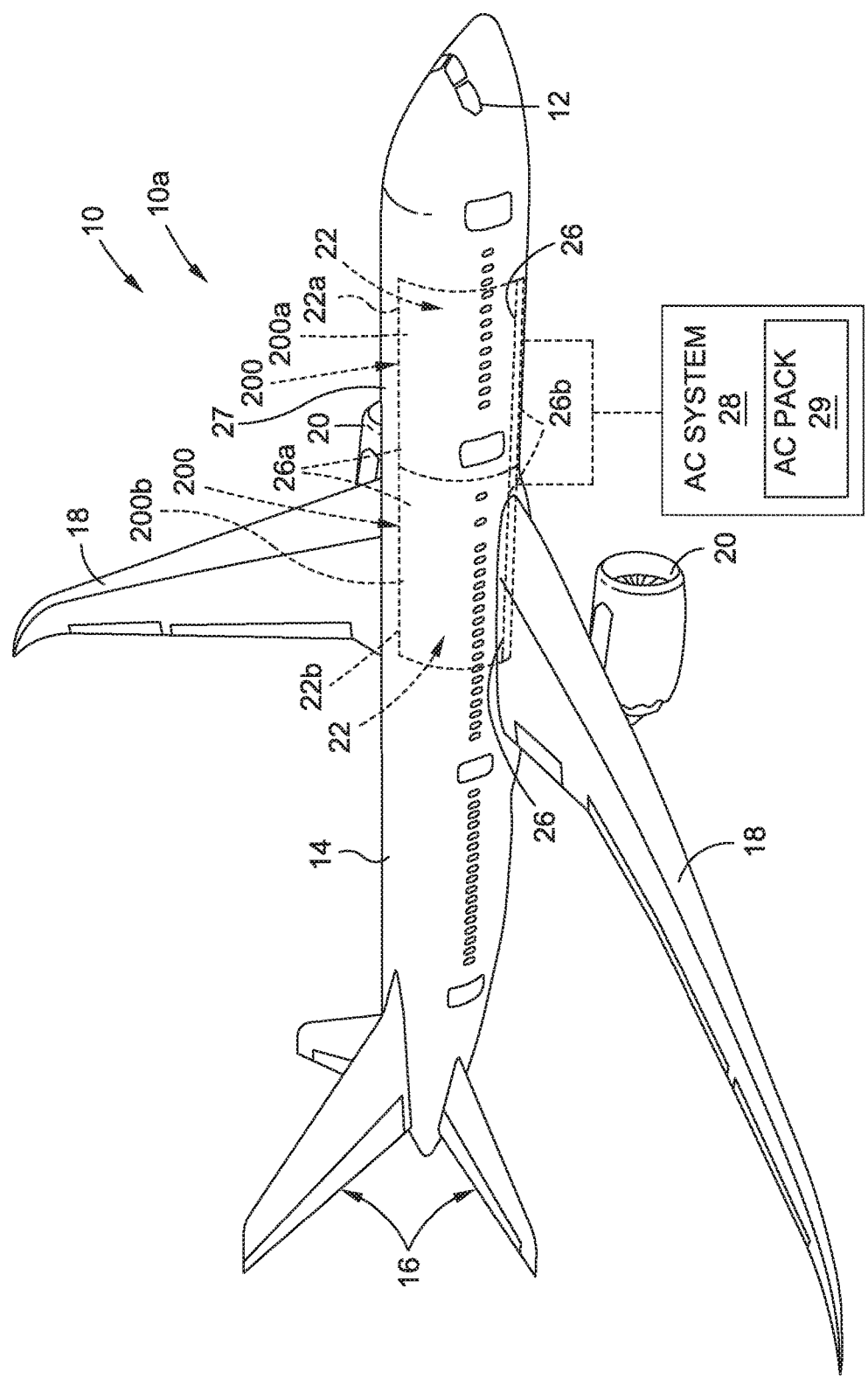
FIG. 1 is an illustration of a schematic diagram of an air vehicle that may incorporate one or more embodiments of an air distribution system of the disclosure.

Now referring to the Figures, FIG. 1 is an illustration of a schematic diagram of an air vehicle 10, such as in the form of an aircraft 10a, that may incorporate one or more embodiments of an air distribution system 200 of the disclosure. As shown in FIG. 1, the air vehicle 10, such as in the form of aircraft 10a, has a cockpit 12, a fuselage 14, a tail 16, wings 18, and engines 20. The fuselage 14 preferably includes a cabin 22 preferably for passengers or cargo. As shown in FIG. 1, the cabin 22 may comprise a first cabin area 22a and a second cabin area 22b, both pressurized with pressurized air. The first cabin area 22a (see FIG. 1) preferably includes an air distribution system 200, such as in the form of a zone A air distribution system 200a. The second cabin area 22b (see FIG. 1) preferably includes an air distribution system 200, such as in the form of a zone B air distribution system (see FIG. 1).

As further shown in FIG. 1, the cabin 22 has a cabin floor 26 that separates an above cabin floor area 26a positioned above the cabin floor 26 of the cabin 22, and a below cabin floor area 26b positioned below the cabin floor 26 of the cabin 22. As further shown in FIG. 1, the air vehicle 10, such as in the form of aircraft 10a, includes an air conditioning (AC) system 28 having an air conditioning (AC) pack 29, positioned in the below cabin floor area 26b.

The air conditioning (AC) system 28 (see FIGS. 1, 5) and the air conditioning (AC) pack 29 are preferably part of an environmental control system (ECS) 60 (see FIGS. 2B, 5) of the air vehicle 10 (see FIG. 1), such as the aircraft 10a (see FIG. 1). The air conditioning (AC) system 28 (see FIGS. 1, 5) provides pressurization, ventilation and temperature and humidity control to the air vehicle 10 (see FIG. 1), such as the aircraft 10a (see FIG. 1), throughout the air vehicle's 10 entire operation.

The air distribution system 200 (see FIG. 1) of the air conditioning (AC) system 28 (see FIGS. 1, 5) is preferably for installation in new aircraft, such as wide-body, high capacity passenger or commercial aircraft. The air distribution system 200 (see FIGS. 1, 5, 6, 8) may be particularly suited for a Boeing 787 aircraft which uses sidewall riser ducts 202 (see FIGS. 6, 8) that are distributed or spread out and that do not require removal of aircraft windows when installed or assembled. However, the specific application of one embodiment of the air distribution system 200 (see FIG. 1) over another may depend on the architecture and size of the aircraft, whether the aircraft is a new design or an existing design, or design considerations of the aircraft.

Figure 2A:
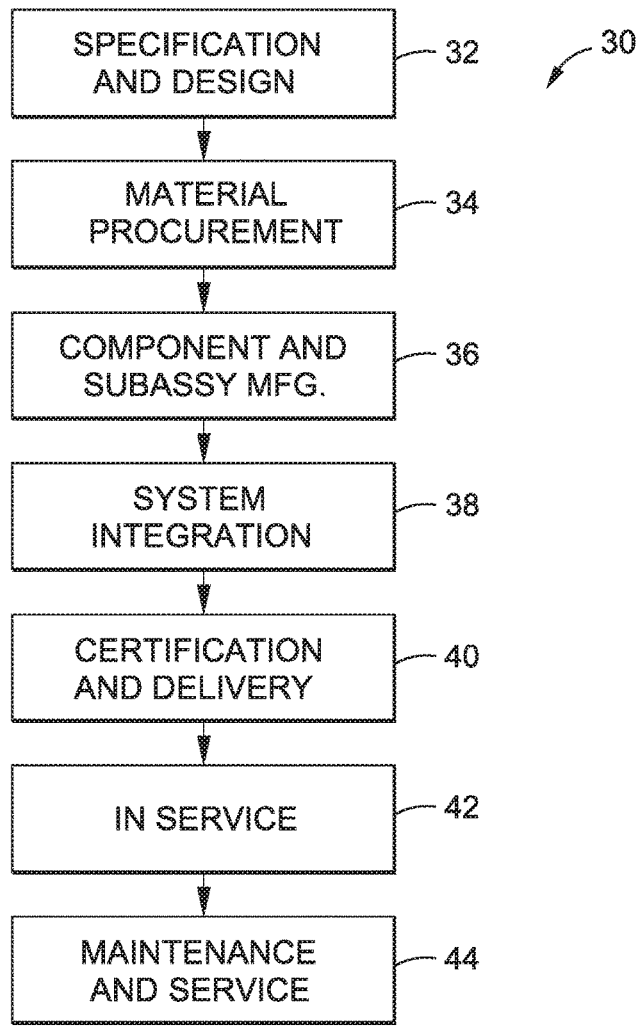
FIG. 2A is an illustration of a flow diagram of an aircraft production and service method.
Figure 2B:
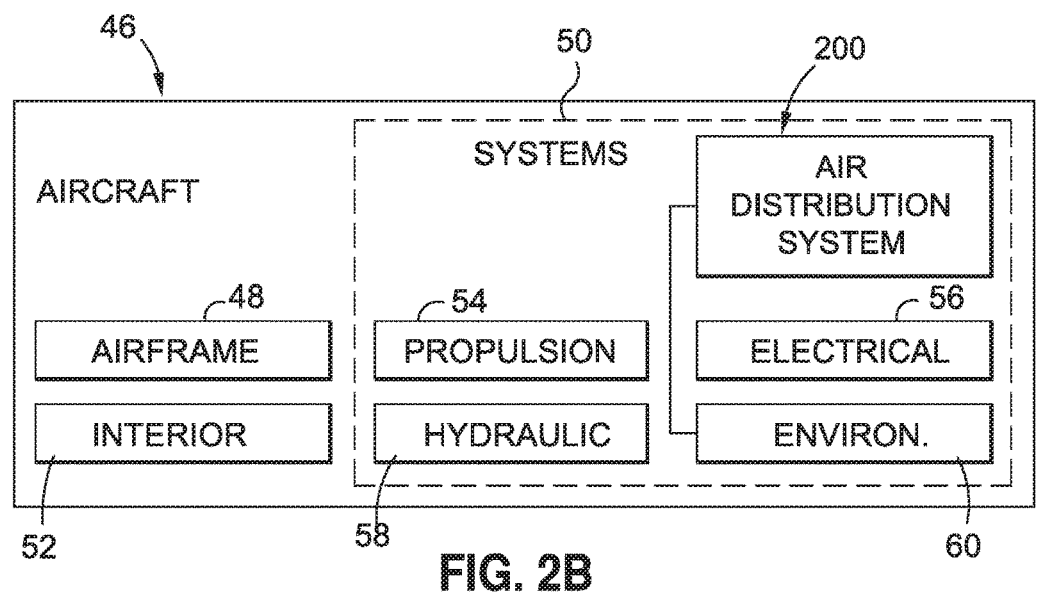
FIG. 2B is an illustration of a block diagram of an aircraft.

Now referring to FIGS. 2A-2B, FIG. 2A is an illustration of a flow diagram of an aircraft production and service method 30. FIG. 2B is an illustration of a block diagram of an aircraft 46. Referring to FIGS. 2A-2B, embodiments of the disclosure may be described in the context of the aircraft production and service method 30, as shown in FIG. 2A, and the aircraft 46, as shown in FIG. 2B. During pre-production, exemplary aircraft production and service method 30 may include specification and design 32 of the aircraft 46 and material procurement 34. During production, component and subassembly manufacturing 36 and system integration 38 of the aircraft 46 takes place. Thereafter, the aircraft 46 may go through certification and delivery 40 in order to be placed in service 42. While in service 42 by a customer, the aircraft 46 may be scheduled for routine maintenance and service 44 which may also include modification, reconfiguration, refurbishment, and other suitable services.

Each of the processes of the aircraft production and service method 30 may be performed or carried out by a system integrator, a third party and/or an operator (e.g., a customer). For the purposes of this description, a system integrator may include without limitation any number of aircraft manufacturers and major-system subcontractors; a third party may include without limitation any number of vendors, subcontractors and suppliers; and, an operator may be an airline, leasing company, military entity, service organization and other suitable operators.

As shown in FIG. 2B, the aircraft 46 produced by exemplary aircraft production and service method 30 may include an airframe 48 with a plurality of high-level systems 50 and an interior 52. Examples of the plurality of high-level systems 50 may include one or more of a propulsion system 54, an electrical system 56, a hydraulic system 58, and an environmental system 60 having one or more embodiments of the air distribution system 200 of the disclosure. Any number of other systems may also be included. Although an aerospace example is shown, the principles of the invention may be applied to other industries, such as the automotive industry.

Methods and systems embodied herein may be employed during any one or more of the stages of the production and service method 30. For example, components or subassemblies corresponding to component and subassembly manufacturing 36 may be fabricated or manufactured in a manner similar to components or subassemblies produced while the aircraft 46 is in service 42. Also, one or more apparatus embodiments, method embodiments, or a combination thereof, may be utilized during component and subassembly manufacturing 36 and system integration 38, for example, by substantially expediting assembly of or reducing the cost of the aircraft 46. Similarly, one or more of apparatus embodiments, method embodiments, or a combination thereof, may be utilized while the aircraft 46 is in service 42, for example and without limitation, to routine maintenance and service 44.

Figure 3:
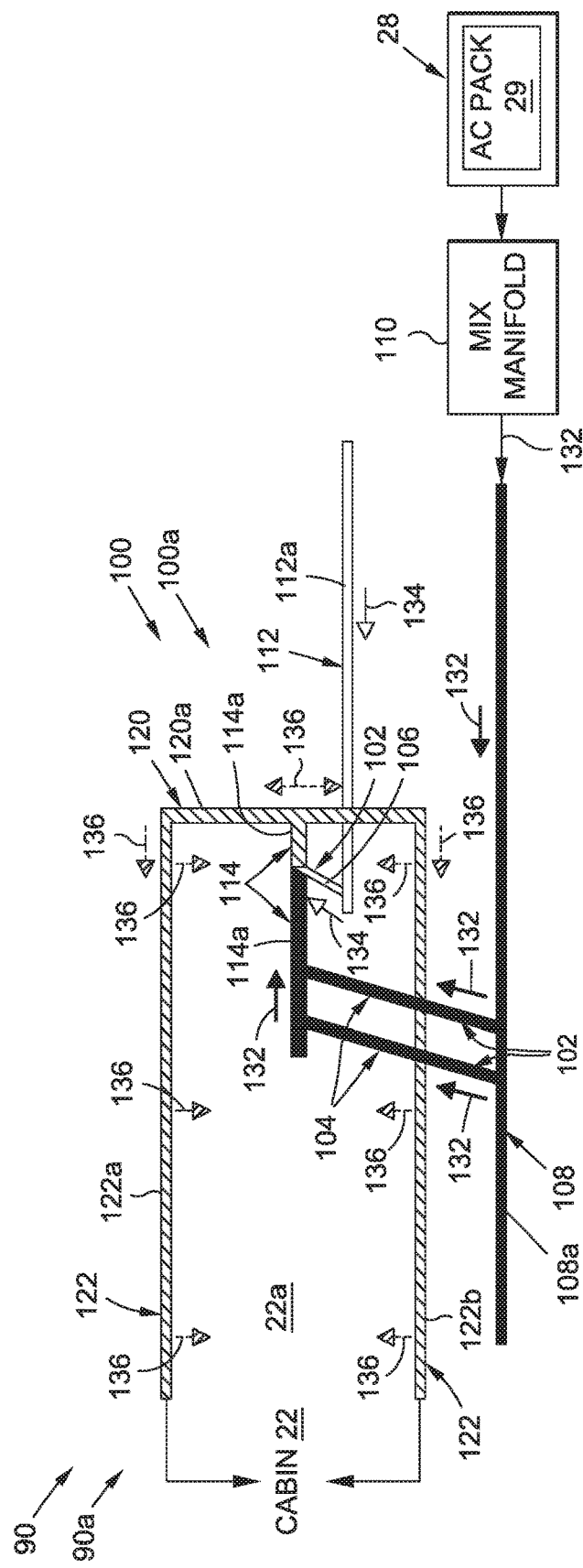
FIG. 3 is a schematic illustration of an air flow scheme using a known air distribution system.

Now referring to FIG. 3, FIG. 3 is a schematic illustration of an air flow scheme 90, such as in the form of air flow scheme 90a, using a known air distribution system 100, such as in the form of a zone A air distribution system 100a. The known air distribution system 100, such as in the form of zone A air distribution system 100a, extends between air conditioning zones 24 (see FIG. 6), including zone A1 24a (see FIG. 6) and zone A2 24b (see FIG. 6), where zone A1 24a (see FIG. 6) is positioned at a forward most direction (←FWD) (see FIG. 6) and zone A2 24b (see FIG. 6) is positioned at an aft most direction (AFT→) (see FIG. 6).

As shown in FIG. 3, a conditioned air flow 132 flows from an air conditioning pack 29 of an air conditioning system 28, through a mix manifold 110, through one or more lower lobe ducts 108, such as one or more conditioned air flow lower lobe ducts 108a, through one or more sidewall riser ducts 102, such as one or more first sidewall riser ducts 104, and through one or more crown mixing ducts 114, such as zone A2 crown mixing duct 114a or another suitable crown mixing duct. FIG. 3 shows two (2) of six (6) first sidewall riser ducts 104.

As further shown in FIG. 3, a recirculated air flow 134 flows through a recirculation air duct 112, such as a zone A recirculation air duct 112a, via a plurality of sidewall riser ducts 102, such as a plurality of second sidewall riser ducts 106, such as ten (10) second sidewall riser ducts 106, to the one or more crown mixing ducts 114, and mixes with the conditioned air flow 132 to form a mixed air flow 136. The recirculation air duct 112 extends in a forward and aft direction.

The mixed air flow 136 (see FIG. 3) is distributed to the one or more crossover ducts 120 (see FIG. 3), such as one or more zone A2 crossover ducts 120a (see FIG. 3), via the crown mixing ducts 114 (see FIG. 3), and flows to a pair of outboard manifold ducts 122 (see FIG. 3), such as a zone A first outboard manifold duct 122a (see FIG. 3) and the zone A second outboard manifold duct 122b (see FIG. 3). As shown in FIG. 3, the mixed air flow 136 is distributed to a cabin 22, such as a first cabin area 22a, through various air flow devices.

Figure 4:
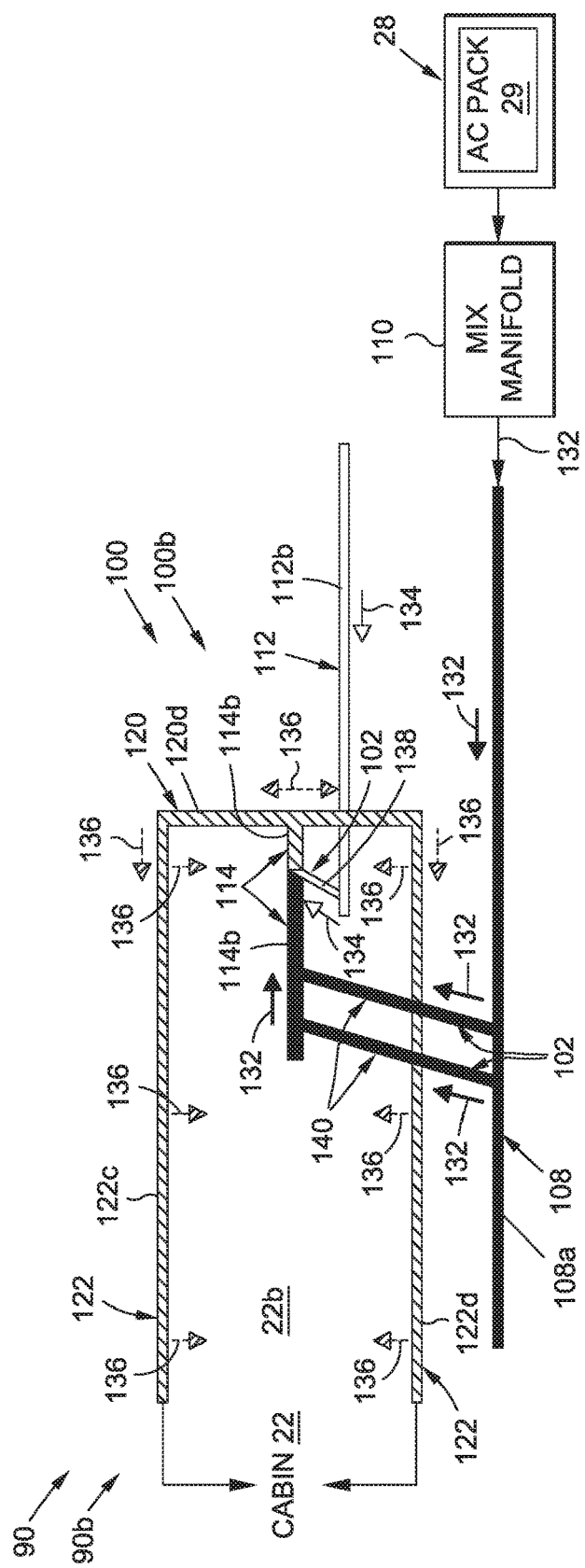
FIG. 4 is a schematic illustration of another air flow scheme using another known air distribution system.

Now referring to FIG. 4, FIG. 4 is a schematic illustration of another air flow scheme 90, such as in the form of air flow scheme 90b, using another known air distribution system 100, such as in the form of a zone B air distribution system 100b. The known air distribution system 100, such as in the form of zone B air distribution system 100b, is positioned aft of zone A air distribution system 100a (see FIG. 3).

As shown in FIG. 4, a conditioned air flow 132 flows from the air conditioning pack 29 of the air conditioning system 28, through the mix manifold 110, through one or more lower lobe ducts 108, such as one or more conditioned air flow lower lobe ducts 108a, through the sidewall riser ducts 102, such as fourth sidewall riser ducts 140, and through the one or more crown mixing ducts 114, such as a zone B crown mixing duct 114b or another suitable crown mixing duct. As further shown in FIG. 4, a recirculated air flow 134 flows through a recirculation air duct 112, such as a zone B recirculation air duct 112b, via a plurality of sidewall riser ducts 102, such as a plurality of third sidewall riser ducts 138, to the one or more crown mixing ducts 114, such as the zone B crown mixing duct 114b, and mixes with the conditioned air flow 132 to form a mixed air flow 136.

As further shown in FIG. 4, the mixed air flow 136 is distributed to the one or more crossover ducts 120, such as one or more zone B crossover ducts 120b, via the one or more crown mixing ducts 114, and flows to a pair of outboard manifold ducts 122, such as a zone B first outboard manifold duct 122c and a zone B second outboard manifold duct 122d. As further shown in FIG. 4, the mixed air flow 136 is distributed to the cabin 22, such as the second cabin area 22b, through various outlets (not shown).

Figure 5:
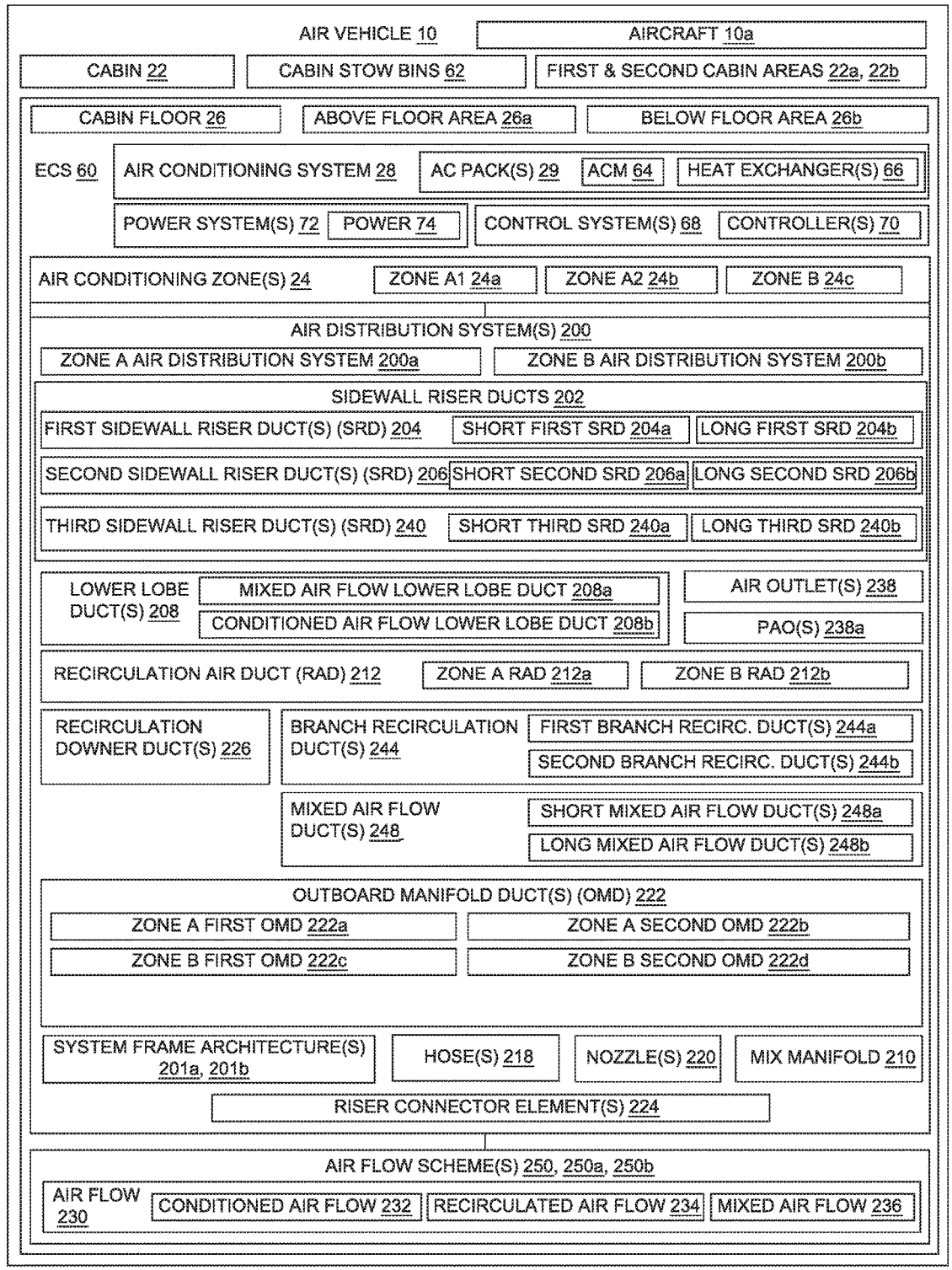
FIG. 5 is an illustration of a functional block diagram of an air vehicle with embodiments of an air distribution system of the disclosure.

Now referring to FIG. 5, FIG. 5 is an illustration of a functional block diagram of an air vehicle 10, such as an aircraft 10a, with one or more embodiments of an air distribution system 200, such as zone A air distribution system 200a, and/or zone B air distribution system 200b, of the disclosure. The air vehicle 10 (see FIGS. 1, 5), such as the aircraft 10a (see FIGS. 1, 5), comprises the fuselage 14

(see FIG. 1), at least one wing 18 (see FIG. 1) connected to the fuselage 14, and a cabin 22 (see FIGS. 1, 5) located within the fuselage 14.

As shown in FIG. 5, the cabin 22 includes a first cabin area 22a (see also FIG. 1), a second cabin area 22b (see also FIG. 1), a cabin floor 26 (see also FIG. 1), an above floor area 26a (see also FIG. 1), a below floor area 26b (see also FIG. 1), and cabin stow bins 62.

As further shown in FIG. 5, the air vehicle 10, such as the aircraft 10a, comprises an environmental control system (ECS) 60 coupled to the cabin 22. As further shown in FIG. 5, the ECS 60 comprises an air conditioning (AC) system 28 having at least one or more air conditioning (AC) packs 29, an air cycle machine (ACM) 64, and one or more heat exchangers 66. The air conditioning (AC) system 28 (see FIGS. 1, 5) may further include turbines, compressors, valves, and other components known in the art. The air conditioning (AC) system 28 (see FIGS. 1, 5) conditions pressurized air intended to be supplied to the air vehicle 10 (see FIGS. 1, 5), such as the aircraft 10a (see FIGS. 1, 5), where the pressurized air is conditioned for temperature via a known cooling cycle system, and where the pressurized air is conditioned for humidity via a known humidity control system. The air conditioning (AC) system 28 (see FIGS. 1, 5) provides pressurization, ventilation and temperature and humidity control to the air vehicle 10 (see FIGS. 1, 5), such as the aircraft 10a (see FIGS. 1, 5), throughout the air vehicle's 10 entire operation.

As shown in FIG. 5, the ECS 60 further comprises one or more control systems 68, each having one or more controllers 70 to control distribution and flow of the air flow 230, such as in the form of conditioned air flow 232, for example, outside air flow, recirculated air flow 234, and mixed air flow 236, through the air distribution system 200, such as zone A air distribution system 200a, or zone B air distribution system 200b. The one or more control systems 68 (see FIG. 5) may be located in the cockpit 12 (see FIG. 1) or flight deck, or in another suitable location in the air vehicle 10 (see FIGS. 1, 5), such as the aircraft 10a (see FIGS. 1, 5). The one or more control systems 68 (see FIG. 5) may be used, for example, to enable and disable valves, switches, fans, and other various components, in order to control and regulate, for example, the amount of air flow 230 (see FIG. 5), the temperature and pressure of the air flow, humidity, ventilation, and other applicable features. For example, the one or more control systems 68 (see FIG. 5) may comprise a mechanical control system, a pneumatic control system, a hydraulic control system, an electrical control system, or another suitable control system.

The one or more controllers 70 (see FIG. 5) may also be located in the cockpit 12 (see FIG. 1) or flight deck, or in another suitable location in the air vehicle 10 (see FIGS. 1, 5), such as the aircraft 10a (see FIGS. 1, 5). The control systems 68 (see FIG. 5) and controllers 70 (see FIG. 5) may be coupled to or connected to the air conditioning (AC) system 28 (see FIGS. 1, 5) of the ECS 60 (see FIG. 5), via one or more wired control lines (not shown) or via wireless couplings or connections (not shown). The controllers 70 (see FIG. 5) may comprise one or more of a computer processing device with associated software, an integrated air system controller with associated software, a digital electronic controller with digital computer and associated software, an analog electronic controller with analog computer and associated software, a pneumatic controller with relay logic circuits and programmable logic controllers or computers, a pneumatic controller with air logic controls and programmable logic controllers or computers, a hydraulic controller with hardwired relay logic and programmable logic controllers or computers, or another suitable controller.

As shown in FIG. 5, the ECS 60 further comprises one or more power systems 72 to provide power 74 to run the ECS 60 and to provide power 74 to one or more components of the air conditioning (AC) system 28 and the air distribution system 200. The one or more power systems 72 (see FIG. 5) may comprise one or more of mechanical or shaft power, pneumatic power, electric power, hydraulic power, or another suitable power system.

The air conditioning (AC) system 28 and the air distribution system 200 (see FIG. 5) provide air flow 230 (see FIG. 5) to one or more air conditioning zones 24, including zone A1 24a (see FIGS. 5, 6), zone A2 24b (see FIGS. 5, 6), zone B 24c (see FIGS. 5, 8), or another suitable air conditioning zone 24.

Figure 7:
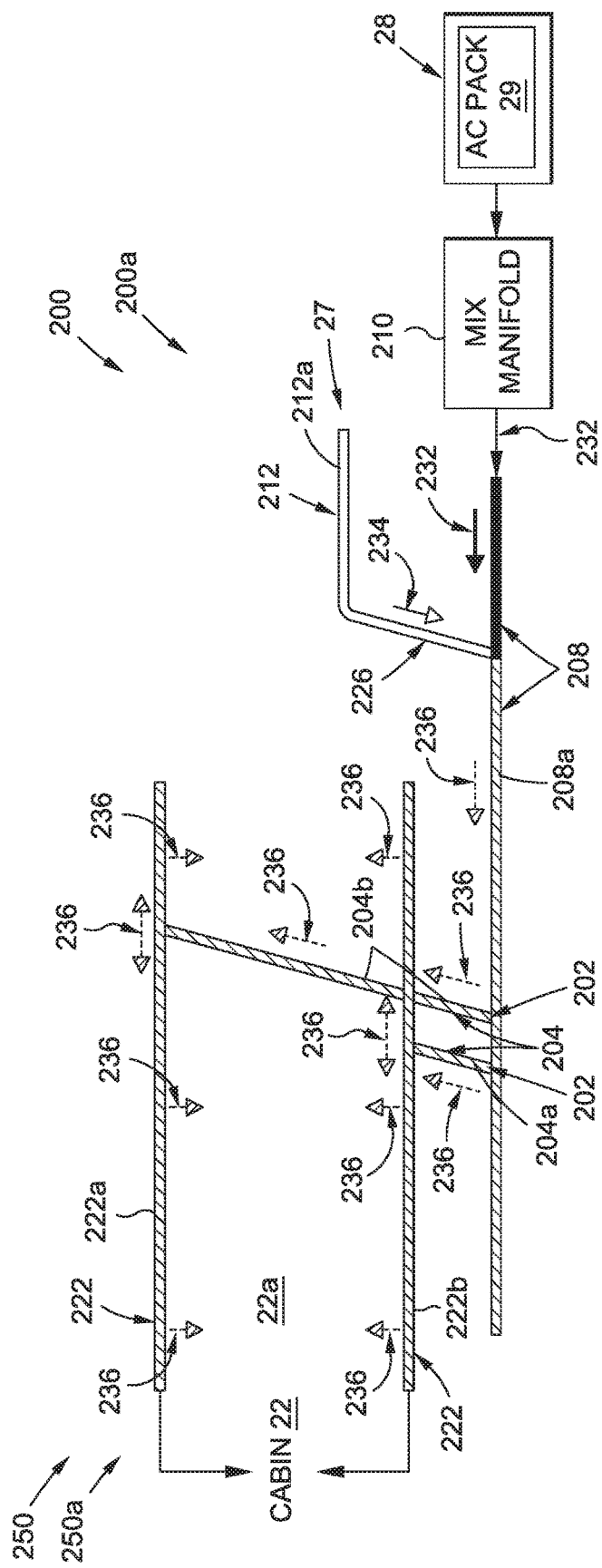
FIG. 7 is a schematic illustration of an air flow scheme using the air distribution system of FIG. 6.
Figure 8:
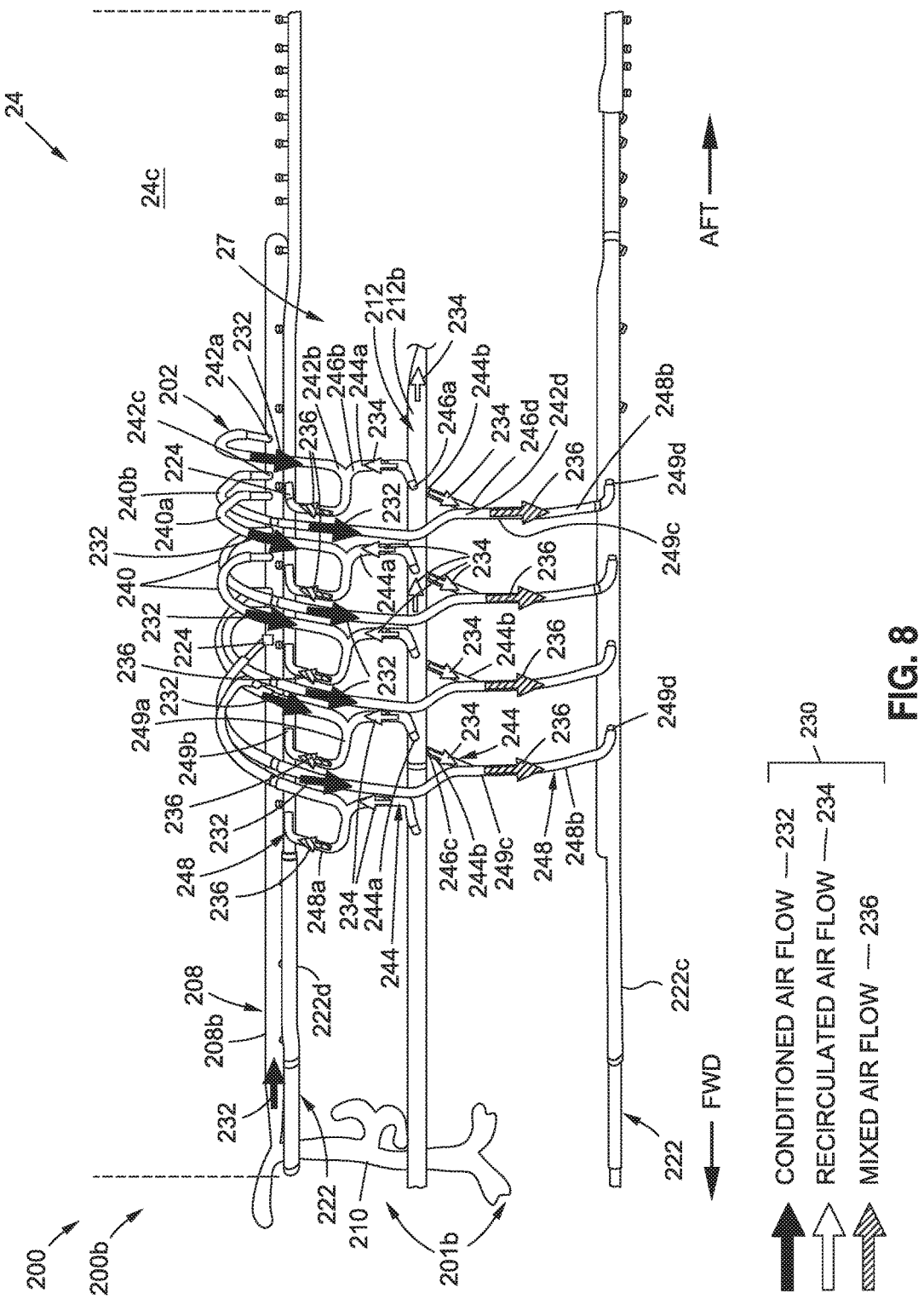
FIG. 8 is an illustration of a top down perspective view of another embodiment of an air distribution system of the disclosure.
Figure 9:
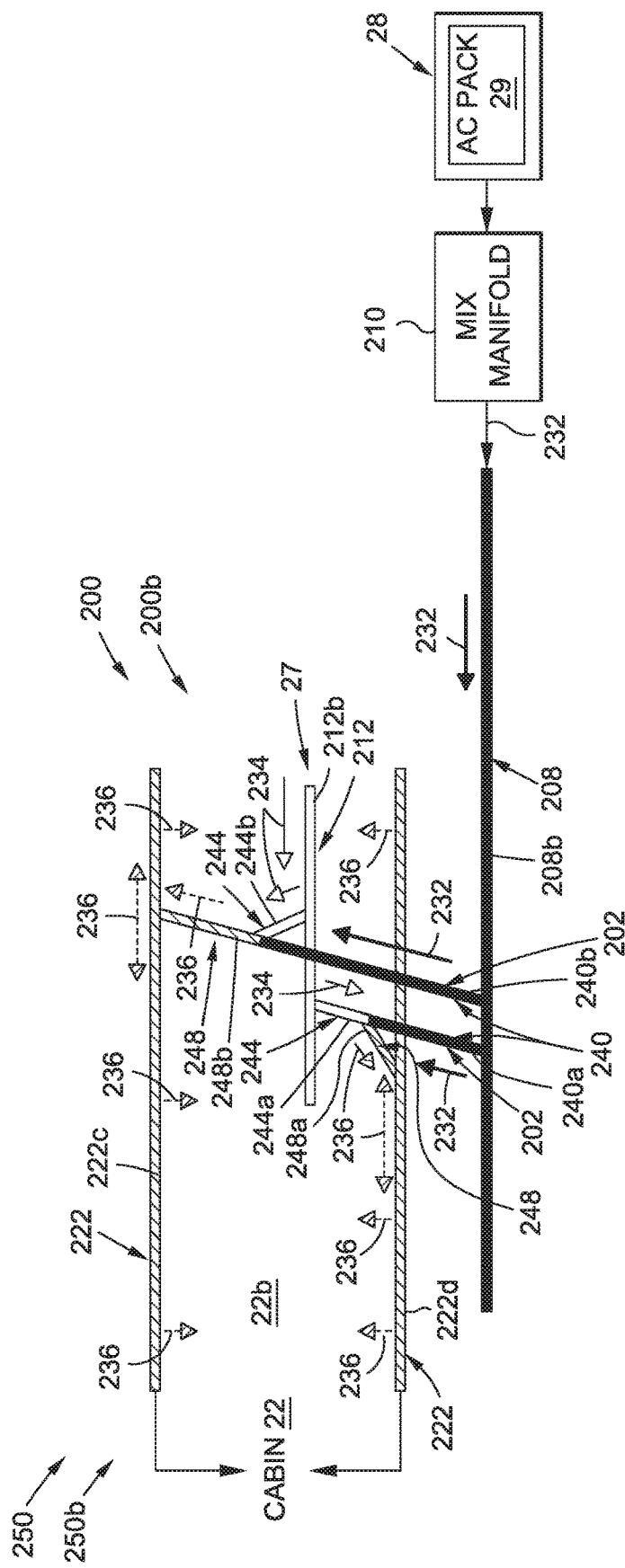
FIG. 9 is a schematic illustration of another air flow scheme using the air distribution system of FIG. 8.

As further shown in FIG. 5, the ECS 60 of the air vehicle 10, such as aircraft 10a, comprises the air distribution system 200, such as in the form of zone A air distribution system 200a (see also FIGS. 6, 7) or zone B air distribution system 200b (see also FIGS. 8, 9). The air distribution system 200 (see FIG. 5), such as in the form of zone A air distribution system 200a (see also FIGS. 5, 6, 7) or zone B air distribution system 200b (see also FIGS. 5, 8, 9), comprises a plurality of sidewall riser ducts (SRDs) 202 (see FIG. 5). Preferably, the sidewall riser ducts 202 (see FIG. 5) are distributed (i.e., spread out) sidewall riser ducts that do not require removal of aircraft windows when installed or assembled.

As shown in FIG. 5, the plurality of sidewall riser ducts 202 comprises first sidewall riser ducts (SRDs) 204, second sidewall riser ducts (SRDs) 206, and third sidewall riser ducts (SRDs) 240. The first sidewall riser ducts (SRDs) 204 (see FIGS. 5, 6) comprise short first SRDs 204a (see FIGS. 5, 6) and long first SRDS 204b (see FIGS. 5, 6). The second sidewall riser ducts (SRDs) 206 (see FIGS. 5, 6) comprise short second SRDs 206a (see FIGS. 5, 6) and long second SRDs 206b (see FIGS. 5, 6). The third sidewall riser ducts (SRDs) 240 (see FIGS. 5, 8) comprise short third SRDs 240a (see FIGS. 5, 8) and long third SRDs 240b (see FIGS. 5, 8).

As further shown in FIG. 5, the air distribution system 200 (see FIG. 5), such as in the form of zone A air distribution system 200a (see also FIGS. 5, 6, 7) or zone B air distribution system 200b (see also FIGS. 5, 8, 9), comprises a plurality of lower lobe ducts 208, such as in the form of mixed air flow lower lobe ducts 208a (see also FIG. 7), or such as in the form of conditioned air flow lower lobe ducts 208b (see also FIG. 9). The lower lobe ducts 208 (see FIG. 5) are located below the cabin floor 26 (see FIG. 5). Each of the plurality of lower lobe ducts 208 (see FIGS. 5, 7, 9) is in fluid communication with a mix manifold 210 (see FIGS. 5, 7, 9) coupled to the one or more air conditioning (AC) packs 29 (see FIGS. 5, 7, 9). The plurality of sidewall riser ducts 202 (see FIG. 5), such as the first sidewall riser ducts 204 (see FIGS. 5, 6) and the second sidewall riser ducts 206 (see FIGS. 5, 6), for the zone A air distribution system 200a (see FIGS. 5, 6), and such as the third sidewall riser ducts 240 (see FIGS. 5, 8) for the zone B air distribution system 200b (see also FIGS. 5, 8), are coupled to the plurality of lower lobe ducts 208 (see FIG. 5).

As further shown in FIG. 5, the air distribution system 200, such as in the form of zone A air distribution system 200a (see also FIGS. 6, 7) or zone B air distribution system 200b (see also FIGS. 8, 9), comprises a recirculation air duct (RAD) 212 located in a crown portion 27 (see FIGS. 1, 7, 9) of the air distribution system 200 above the cabin floor 26 (see also FIG. 1). For the zone A air distribution system 200a (see FIGS. 5, 6, 7), the recirculation air duct (RAD) 212 (see FIGS. 5, 6, 7) preferably comprises a zone A recirculation air duct (RAD) 212a (see FIGS. 5, 6, 7). For the zone B air distribution system 200b (see FIGS. 5, 8, 9), the recirculation air duct (RAD) 212 (see FIGS. 5, 8, 9) preferably comprises a zone B recirculation air duct (RAD) 212b (see FIGS. 5, 8, 9).

As further shown in FIG. 5, the air distribution system 200, such as in the form of zone A air distribution system 200a (see also FIGS. 6, 7), comprises a plurality of recirculation downer ducts 226. The plurality of recirculation downer ducts 226 (see FIGS. 5, 6, 7) are coupled between the recirculation air duct 212 (see FIGS. 5, 6, 7) and the plurality of lower lobe ducts 208 (see FIGS. 5, 6, 7). As further shown in FIG. 5, the air distribution system 200, such as in the form of zone B air distribution system 200b (see also FIGS. 8, 9), comprises a plurality of branch recirculation ducts 244, including first branch recirculation ducts 244a (see also FIGS. 8, 9) and second branch recirculation ducts 244b (see also FIGS. 8, 9).

As further shown in FIG. 5, the air distribution system 200, such as in the form of zone B air distribution system 200b (see also FIGS. 8, 9), comprises a plurality of mixed air flow ducts 248 (see also FIGS. 8, 9) comprising a plurality of short mixed air flow ducts 248a (see also FIGS. 8, 9) and a plurality of long mixed air flow ducts 248b (see also FIGS. 8, 9).

As further shown in FIG. 5, the air distribution system 200, such as in the form of zone A air distribution system 200a (see also FIGS. 6, 7) or zone B air distribution system 200b (see also FIGS. 8, 9), comprises a pair of outboard manifold ducts 222. The pair of outboard manifold ducts 222 may be coupled to the plurality of sidewall riser ducts 202 (see FIG. 6), or coupled to the plurality of mixed air flow ducts 248 (see FIG. 8). For the zone A air distribution system 200a (see FIGS. 5, 6, 7), the pair of outboard manifold ducts (OMDs) 222 (see FIGS. 5, 6, 7) comprise a zone A first outboard manifold duct (OMD) 222a (see FIGS. 5, 6, 7) and a zone A second outboard manifold duct (OMD) 222b (see FIGS. 5, 6, 7). For the zone B air distribution system 200b (see FIGS. 5, 8, 9), the pair of outboard manifold ducts (OMDs) 222 (see FIGS. 5, 8, 9) comprise a zone B first outboard manifold duct (OMD) 222c (see FIGS. 5, 8, 9) and a zone B second outboard manifold duct (OMD) 222d (see FIGS. 5, 8, 9).

The pair of outboard manifold ducts 222 (see FIG. 5) each preferably connect to one or more hoses 218 (see FIG. 5), one or more nozzles 220 (see FIG. 5), and a plurality of air outlets 238 (see FIG. 5), including a plurality of personal air outlets (PAOs) 238a (see FIG. 5) and other suitable air outlets, to distribute air flow 230 (see FIG. 5), such as mixed air flow 236 (see FIG. 5) into the cabin 22 (see FIG. 5).

As further shown in FIG. 5, the air distribution system 200, such as in the form of zone A air distribution system 200a (see also FIGS. 6, 7) or zone B air distribution system 200b (see also FIGS. 8, 9), comprises a plurality of riser connector elements 224 (see also FIGS. 6, 8) to connect the plurality of sidewall riser ducts 202 (see also FIG. 6) to the pair of outboard manifold ducts 222 (see FIGS. 6, 8) and/or to connect the plurality of sidewall riser ducts 202 (see also FIG. 8) to the plurality of lower lobe ducts 208 (see also FIG. 8).

As further shown in FIG. 5, the air distribution system 200, such as in the form of zone A air distribution system 200a (see also FIGS. 6, 7) or zone B air distribution system 200b (see also FIGS. 8, 9), comprises a conditioned air flow 232, such as, for example, outside conditioned air flow. The conditioned air flow 232 (see FIGS. 5, 7, 9) is distributed from the one or more AC packs 29 (see FIGS. 5, 7, 9), through the mix manifold 210 (see FIGS. 5, 7, 9), and either to one of, the plurality of lower lobe ducts 208 (see FIGS. 5, 7), or the plurality of lower lobe ducts 208 (see FIGS. 5, 9) and then the plurality of sidewall riser ducts 202 (see FIGS. 5, 9).

As further shown in FIG. 5, the air distribution system 200, such as in the form of zone A air distribution system 200a (see also FIGS. 6, 7) or zone B air distribution system 200b (see also FIGS. 8, 9), comprises a recirculated air flow 234. The recirculated air flow 234 (see FIGS. 5, 7, 9) is distributed from the recirculation air duct 212 (see FIGS. 5, 6, 7), to one of, the plurality of recirculation downer ducts 226 (see FIGS. 5, 6, 7) coupled to the recirculation air duct 212 (see FIGS. 5, 6, 7), or the plurality of branch recirculation ducts 244 (see FIGS. 5, 8, 9) coupled to the recirculation air duct 212 (see FIGS. 5, 8, 9).

As further shown in FIG. 5, the air distribution system 200, such as in the form of zone A air distribution system 200a (see also FIGS. 6, 7) or zone B air distribution system 200b (see also FIGS. 8, 9), comprises a mixed air flow 236. The mixed air flow 236 (see FIGS. 5, 7, 9) is formed by mixing the conditioned air flow 232 (see FIGS. 5, 7, 9) and the recirculated air flow 234 (see FIGS. 5, 7, 9). The mixed air flow 236 (see FIGS. 5, 7, 9) is distributed to and through the one or more outboard manifold ducts 222 (see FIGS. 5, 7, 9), and into the cabin 22 (see FIGS. 5, 7, 9) of the air vehicle 10 (see FIGS. 1, 5), such as the aircraft 10a (see FIGS. 1, 5).

The air distribution system 200 (see FIG. 5), such as in the form of zone A air distribution system 200a (see FIG. 5) and zone B air distribution system 200b (see FIG. 5), eliminates a need for crown mixing ducts 114 (see FIGS. 3, 4), crossover ducts 120 (see FIGS. 3, 4), and other heavy parts, such as mufflers (not shown), as compared to known air distribution systems 100 (see FIGS. 3, 4) that require crown mixing ducts 114 (see FIGS. 3, 4), crossover ducts 120 (see FIGS. 3, 4), and other heavy parts, such as mufflers. Thus, the air distribution system 200 (see FIG. 5), such as in the form of zone A air distribution system 200a (see FIG. 5) and zone B air distribution system, 200b (see FIG. 5), have a simplified system frame architecture 201a (see FIGS. 5, 6) or system frame architecture 201b (see FIGS. 5, 8), which, in turn, results in an easier, more efficient, and faster assembly, have a reduced weight, and have a reduced part cost which, in turn, results in a reduced overall manufacturing cost.

Figure 6:
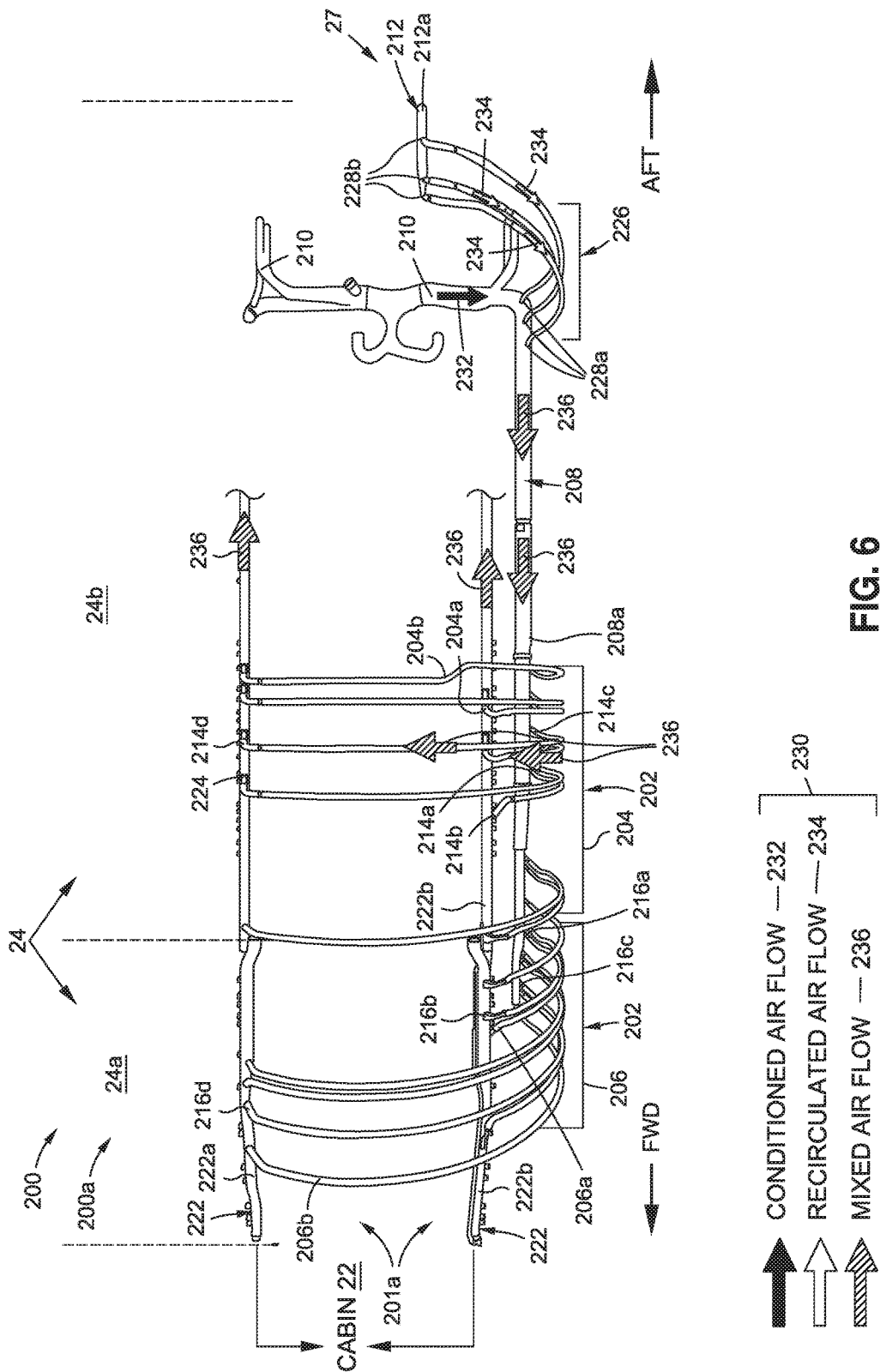
FIG. 6 is an illustration of a top down perspective view of an embodiment of an air distribution system of the disclosure.

Now referring to FIG. 6, FIG. 6 is an illustration of a top down perspective view of an embodiment of the air distribution system 200, such as in the form of zone A air distribution system 200a, of the disclosure. As shown in FIG. 6, the air distribution system 200, such as in the form of zone A air distribution system 200a, comprises a system frame architecture 201a that extends between air conditioning zones 24 (see FIG. 6), including zone A1 24a and zone A2 24b. Zone A1 24a (see FIG. 6) is positioned at a forward most direction (←FWD), and zone A2 24b (see FIG. 6) is positioned at an aft most direction (AFT→). Zone A2 24b (see FIG. 6) is aft of zone A1 24a (see FIG. 6).

As further shown in FIG. 6, the air distribution system 200, such as in the form of zone A air distribution system 200a, comprises a plurality of sidewall riser ducts 202. The plurality of sidewall riser ducts 202 (see FIG. 6) comprises a plurality of first sidewall riser ducts 204 (see FIG. 6), such as in the form of short first sidewall riser ducts 204a (see FIG. 6) and long first sidewall riser ducts 204b (see FIG. 6), located in zone A2 24b (see FIG. 6). Each of the short first sidewall riser ducts 204a (see FIG. 6) comprises a first end portion 214a (see FIG. 6) coupled or connected to the lower lobe duct 208 (see FIG. 6), such as in the form of mixed air flow lower lobe duct 208a (see FIG. 6), and comprises a second end portion 214b (see FIG. 6) coupled or connected to the outboard manifold duct 222 (see FIG. 6), such as the zone A second outboard manifold duct 222b (see FIG. 6). Each of the long first sidewall riser ducts 204b (see FIG. 6) comprises a first end portion 214c (see FIG. 6) coupled or connected to the lower lobe duct 208 (see FIG. 6), such as in the form of mixed air flow lower lobe duct 208a (see FIG. 6), and comprises a second end portion 214d (see FIG. 6) coupled or connected to the outboard manifold duct 222 (see FIG. 6), such as the zone A first outboard manifold duct 222a (see FIG. 6).

As shown in FIG. 6, the air distribution system 200, such as in the form of zone A air distribution system 200a, comprises nine (9) first sidewall riser ducts 204 which are in zone A2 24b (see FIG. 6). The known air distribution system 100 (see FIG. 3), such as in the form of known zone A air distribution system 100a (see FIG. 3), comprises fewer first sidewall riser ducts 104 (see FIG. 3). With this embodiment of the air distribution system 200, such as in the form of zone A air distribution system 200a, additional first sidewall riser ducts 204 (see FIG. 6) have been added.

As further shown in FIG. 6, the air distribution system 200, such as in the form of zone A air distribution system 200a, comprises a plurality of sidewall riser ducts (SRDs) 202, such as in the form of second sidewall riser ducts (SRDs) 206, comprising short second sidewall riser ducts 206a and long second sidewall riser ducts 206b, and located in zone A1 24a. Each of the short second sidewall riser ducts 206a (see FIG. 6) comprises a first end portion 216a (see FIG. 6) coupled or connected to the lower lobe duct 208 (see FIG. 6), such as in the form of mixed air flow lower lobe duct 208a (see FIG. 6), and comprises a second end portion 216b (see FIG. 6) coupled or connected to the outboard manifold duct 222 (see FIG. 6), such as the zone A second outboard manifold duct 222b (see FIG. 6). Each of the long second sidewall riser ducts 206b (see FIG. 6) comprises a first end portion 216c (see FIG. 6) coupled or connected to the lower lobe duct 208 (see FIG. 6), such as in the form of mixed air flow lower lobe duct 208a (see FIG. 6), and comprises a second end portion 216d (see FIG. 6) coupled or connected to the outboard manifold duct 222 (see FIG. 6), such as the zone A first outboard manifold duct 222a (see FIG. 6).

As shown in FIG. 6, the air distribution system 200, such as in the form of zone A air distribution system 200a, comprises eight (8) second sidewall riser ducts 206 which are in zone A1 24a (see FIG. 6). The known air distribution system 100 (see FIG. 3), such as in the form of known zone A air distribution system 100a (see FIG. 3), comprises fewer second sidewall riser ducts 106 (see FIG. 3). With this embodiment of the air distribution system 200, such as in the form of zone A air distribution system 200a, one or more additional second sidewall riser duct 206 (see FIG. 6) have been added.

With this embodiment of the air distribution system 200 (see FIG. 6), such as in the form of zone A air distribution system 200a (see FIG. 6), former sidewall riser ducts 102 (see FIG. 3) have been converted to three (3) recirculation downer ducts 226 (see FIG. 6).

As shown in FIG. 6, the air distribution system 200, such as in the form of zone A air distribution system 200a, further comprises a plurality of lower lobe ducts 208, such as in the form of mixed air flow lower lobe ducts 208a, located below the cabin floor 26 (see FIGS. 1, 5) of the cabin 22 (see FIGS. 1, 5, 6, 7) of the air vehicle 10 (see FIGS. 1, 5), such as the aircraft 10a (see FIGS. 1, 5). Each of the plurality of lower lobe ducts 208 (see FIG. 6, 7) is preferably in fluid communication with the mix manifold 210 (see FIGS. 6, 7) coupled to one or more air conditioning (AC) packs 29 (see FIG. 7) of the air conditioning system 28 (see FIG. 7) in the air vehicle 10 (see FIGS. 1, 5). One or more of the plurality of sidewall riser ducts 202 (see FIGS. 6, 7), such as in the form of first sidewall riser ducts 204 (see FIG. 6), and second sidewall riser ducts 206 (see FIG. 6), are also preferably coupled or connected to the plurality of lower lobe ducts 208 (see FIGS. 6, 7), such as in the form of mixed air flow lower lobe ducts 208a (see FIGS. 6, 7).

As shown in FIG. 6, the air distribution system 200, such as in the form of zone A air distribution system 200a, further comprises a recirculation air duct 212, such as a zone A recirculation air duct 212a, located in a crown portion 27 of the air distribution system 200, such as in the form of zone A air distribution system 200a, above the cabin floor 26 (see FIGS. 1, 5).

As shown in FIG. 6, the air distribution system 200, such as in the form of zone A air distribution system 200b, further comprises a plurality of recirculation downer ducts 226 coupled between the recirculation air duct 212 and the plurality of lower lobe ducts 208, such as the mixed air flow lower lobe ducts 208a. As shown in FIG. 6, each of the recirculation downer ducts 226 comprises a first end portion 228a connected to the lower lobe duct 208, such as the mixed air flow lower lobe duct 208a. As further shown in FIG. 6, each of the recirculation downer ducts 226 comprises a second end portion 228b connected to the recirculation air duct 212.

As shown in FIG. 6, the air distribution system 200, such as in the form of zone A air distribution system 200a, further comprises the pair of outboard manifold ducts 222, such as in the form of zone A first outboard manifold duct 222a and zone A second outboard manifold duct 222b, coupled to the plurality of sidewall riser ducts 202, such as the first sidewall riser ducts 204 and the second sidewall riser ducts 206. The pair of outboard manifold ducts 222 (see FIGS. 5, 6) each preferably connect to one or more hoses 218 (see FIG. 5), one or more nozzles 220 (see FIG. 5), and a plurality of air outlets 238 (see FIG. 5), including a plurality of personal air outlets (PAOs) 238a (see FIG. 5), to distribute the mixed air flow 236 (see FIGS. 5, 6, 7) into the cabin 22 (see FIGS. 5, 6, 7).

As shown in FIG. 6, the air distribution system 200, such as in the form of zone A air distribution system 200a, further comprises air flow 230, such as a conditioned air flow 232, distributed from the one or more AC packs 29 (see FIG. 7), through the mix manifold 210 (see also FIG. 7), to the plurality of lower lobe ducts 208 (see also FIG. 7), such as the mixed air flow lower lobe ducts 208a (see also FIG. 7).

As shown in FIG. 6, the air distribution system 200, such as in the form of zone A air distribution system 200a, further comprises air flow 230, such as a recirculated air flow 234, distributed from the recirculation air duct 212, such as the zone A recirculation air duct 212a, through the plurality of recirculation downer ducts 226, and to the plurality of lower lobe ducts 208, such as the mixed air flow lower lobe ducts 208a.

As shown in FIG. 6, the air distribution system 200, such as in the form of zone A air distribution system 200a, further comprises air flow 230, such as a mixed air flow 236 formed by mixing the conditioned air flow 232 and the recirculated air flow 234 in the plurality of lower lobe ducts 208, such as the mixed air flow lower lobe ducts 208a, below the cabin floor 26 (see FIG. 1). The mixed air flow 236 (see FIG. 6) is distributed through the pair of outboard manifold ducts 222, such as in the form of zone A first outboard manifold duct 222a (see FIG. 6) and zone A second outboard manifold duct 222b (see FIG. 6), and into the cabin 22 of the air vehicle 10 (see FIGS. 1, 5), such as an aircraft 10a (see FIGS. 1, 5).

In the embodiment of the air distribution system 200, such as in the form of zone A air distribution system 200a, shown in FIG. 6, the conditioned air flow 232 and the recirculated air flow 234 are mixed in one or more of the plurality of lower lobe ducts 208, such as the mixed air flow lower lobe ducts 208a (see also FIG. 7), located below the cabin floor 26 (see FIGS. 1, 5) of the cabin 22 (see also FIGS. 1, 5, 7), to form the mixed air flow 236. The mixed air flow 236 (see FIG. 6) is distributed from the plurality of lower lobe ducts 208 (see FIG. 6) to the pair of outboard manifold ducts 222 (see FIG. 6), such as in the form of zone A first outboard manifold duct 222a (see FIG. 6) and zone A second outboard manifold duct 222b (see FIG. 6), via the short first sidewall riser ducts 204a (see FIG. 6) and the long first sidewall riser ducts 204b (see FIG. 6).

The air distribution system 200 (see FIG. 6), such as in the form of zone A air distribution system 200a (see FIG. 6), further preferably comprises a plurality of riser connector elements 224 (see FIG. 6) to connect the plurality of sidewall riser ducts 202, such as in the form of first sidewall riser ducts 204 (see FIG. 6), to the pair of outboard manifold ducts 222 (see FIG. 6), such as in the form of zone A first outboard manifold duct 222a (see FIG. 6) and zone A second outboard manifold duct 222b (see FIG. 6).

The air distribution system 200 (see FIG. 7), such as in the form of zone A air distribution system 200a (see FIG. 7), may further comprises various known parts, such as valves (not shown), and other associated parts.

In the embodiment of the air distribution system 200, such as in the form of zone A air distribution system 200a, shown in FIG. 6, the need for crown mixing ducts 114 (see FIG. 3), crossover ducts 120 (see FIG. 3), and mufflers (not shown), is eliminated, as compared to the known air distribution system 100 (see FIG. 3), such as the known zone A air distribution system 100a (see FIG. 3), that requires crown mixing ducts 114 (see FIG. 3), crossover ducts 120 (see FIG. 3), and mufflers (not shown). Thus, the air distribution system 200 (see FIG. 6), such as in the form of zone A air distribution system 200a (see FIG. 6), has a simplified system frame architecture 201a (see FIG. 6), which, in turn, results in an easier, more efficient, and faster assembly, has a reduced weight, and has a reduced part cost which, in turn, results in a reduced overall manufacturing cost.

Now referring to FIG. 7, FIG. 7 is a schematic illustration of an air flow scheme 250, such as in the form of air flow scheme 250a, using the air distribution system 200, such as in the form of zone A air distribution system 200a, of FIG. 6. As shown in FIG. 7, conditioned air flow 232 flows from the air conditioning pack 29 of the air conditioning system 28, through the mix manifold 210, and to the lower lobe ducts 208, such as the mixed air flow lower lobe ducts 208a. As further shown in FIG. 7, recirculated air flow 234 flows from the crown 27 (see also FIG. 1) through the recirculation air duct 212, such as the zone A recirculation air duct 212a, through one or more recirculation downer ducts 226, and to the lower lobe ducts 208, such as in the form of mixed air flow lower lobe ducts 208a.

The conditioned air flow 232 (see FIG. 7) and the recirculated air flow 234 (see FIG. 7) are mixed in the lower lobe ducts 208 (see FIG. 7), such as the mixed air flow lower lobe ducts 208a (see FIG. 7), to form the mixed air flow 236 (see FIG. 7). As shown in FIG. 7, the mixed air flow 236 flows through the sidewall riser ducts 202, such as in the form of first sidewall riser ducts 204, including short first sidewall riser ducts 204a and long first sidewall riser ducts 204b. As further shown in FIG. 7, the mixed air flow 236 flows to the outboard manifold ducts 222, such as the zone A first outboard manifold duct 222a and the zone A second outboard manifold duct 222b. As further shown in FIG. 7, the mixed air flow 236 is distributed to the cabin 22, such as the first cabin area 22a via hoses 218 (see FIG. 5) and nozzles 220 (see FIG. 5). The mixed air flow 236 (see FIG. 7) flows into the cabin 22 (see FIGS. 1, 5, 7) through air outlets 238 (see FIG. 5) around or near cabin stow bins 62 (see FIG. 5), through personal air outlets (PAOs) 238a (see FIG. 5), and/or through other suitable air outlets.

Now referring to FIG. 8, FIG. 8 is an illustration of a top down perspective view of another embodiment of an air distribution system 200, such as in the form of zone B air distribution system 200b, of the disclosure. As shown in FIG. 8, the air distribution system 200, such as in the form of zone B air distribution system 200b, comprises a system frame architecture 201b that extends over air conditioning zone 24 (see FIG. 8), including zone B 24c (see FIG. 8), where zone B 24c is positioned aft of and at an aft most direction (AFT→) to zone A1 24a (see FIG. 6) and zone A2 24b (see FIG. 6).

As further shown in FIG. 8, the air distribution system 200, such as in the form of zone B air distribution system 200b, comprises a plurality of sidewall riser ducts 202. The plurality of sidewall riser ducts 202 (see FIG. 8) comprises third sidewall riser ducts 240 (see FIG. 8), such as in the form of short third sidewall riser ducts 240a (see FIG. 8) and long third sidewall riser ducts 240b (see FIG. 8). Each of the short third sidewall riser ducts 240a (see FIG. 8) comprises a first end portion 242a (see FIG. 8) coupled or connected to a lower lobe duct 208 (see FIG. 8), such as a conditioned air flow lower lobe duct 208b (see FIG. 8), and comprises a second end portion 242b (see FIG. 8) coupled or connected to the intersection of or joining of a branch recirculation duct 244 (see FIG. 8), such as a first branch recirculation duct 244a (see FIG. 8), and a mixed air flow duct 248 (see FIG. 8), such as a short mixed air flow duct 248a (see FIG. 8). Each of the long third sidewall riser ducts 240b (see FIG. 8) comprises a first end portion 242c (see FIG. 8) coupled or connected to a lower lobe duct 208 (see FIG. 8), such as a conditioned air flow lower lobe duct 208b (see FIG. 8), and comprises a second end portion 242d (see FIG. 8) coupled or connected to the intersection of a branch recirculation duct 244 (see FIG. 8), such as a second branch recirculation duct 244b (see FIG. 8), and a mixed air flow duct 248 (see FIG. 8), such as a long mixed air flow duct 248b (see FIG. 8). As shown in FIG. 8, the air distribution system 200, such as in the form of zone B air distribution system 200b, comprises nine (9) third sidewall riser ducts 240 each connected to the lower lobe duct 208, such as the conditioned air flow lower lobe duct 208b.

As shown in FIG. 8, the air distribution system 200, such as in the form of zone B air distribution system 200b, further comprises a plurality of lower lobe ducts 208, such as in the form of conditioned air flow lower lobe ducts 208b, located below the cabin floor 26 (see FIGS. 1, 5) of the cabin 22 (see FIGS. 1, 5, 9) of the air vehicle 10 (see FIGS. 1, 5), such as the aircraft 10a (see FIGS. 1, 5). Each of the plurality of lower lobe ducts 208 (see FIGS. 8, 9) is preferably in fluid communication with the mix manifold 210 (see FIGS. 8, 9) coupled to one or more air conditioning (AC) packs 29 (see FIG. 9) of the air conditioning system 28 (see FIG. 9) in the air vehicle 10 (see FIGS. 1, 5). One or more of the plurality of sidewall riser ducts 202 (see FIGS. 8, 9), such as in the form of third sidewall riser ducts 240 (see FIG. 8), are also preferably coupled or connected to the plurality of lower lobe ducts 208 (see FIGS. 8, 9), such as in the form of conditioned air flow lower lobe ducts 208b (see FIGS. 8, 9).

As shown in FIG. 8, the air distribution system 200, such as in the form of zone B air distribution system 200b, further comprises a recirculation air duct 212, such as a zone B recirculation air duct 212b, located in a crown portion 27 (see FIGS. 8, 9) of the air distribution system 200, such as in the form of zone B air distribution system 200b, above the cabin floor 26 (see FIGS. 1, 5). As shown in FIG. 8, the air distribution system 200, such as in the form of zone B air distribution system 200b, further comprises a plurality of branch recirculation ducts 244 (see also FIG. 9) coupled to the recirculation air duct 212, such as the zone B recirculation air duct 212b. The plurality of branch recirculation ducts 244 (see FIGS. 8, 9) comprise a plurality of first branch recirculation ducts 244a (see FIGS. 8, 9). FIG. 8 shows five (5) first branch recirculation ducts 244a. As shown in FIG. 8, each of the first branch recirculation ducts 244a comprises a first end portion 246a connected or coupled to the recirculation air duct 212, and comprises a second end portion 246b connected or coupled to the intersection of the short third sidewall riser duct 240a and the short mixed air flow duct 248a.

The plurality of branch recirculation ducts 244 (see FIGS. 8, 9) further comprise a plurality of second branch recirculation ducts 244b (see FIGS. 8, 9). FIG. 8 shows four (4) second branch recirculation ducts 244b. As further shown in FIG. 8, each of the second branch recirculation ducts 244b comprises a first end portion 246c connected or coupled to the recirculation air duct 212, and comprises a second end portion 246d connected or coupled to the intersection of the long third sidewall riser duct 240b and the long mixed air flow duct 248b.

As shown in FIG. 8, the air distribution system 200, such as in the form of zone B air distribution system 200b, further comprises a plurality of mixed air flow ducts 248 comprising short mixed air flow ducts 248a and long mixed air flow ducts 248b. FIG. 8 shows five (5) short mixed air flow ducts 248a and four (4) long mixed air flow ducts 248b. As shown in FIG. 8, each of the short mixed air flow ducts 248a comprises a first end portion 249a connected or coupled to the intersection of or joining of the short third sidewall riser duct 240a and the first branch recirculation duct 244a. As further shown in FIG. 8, each of the short mixed air flow ducts 248a comprises a second end portion 249b connected or coupled to each lower lobe ducts 208, such as in the form of conditioned air flow lower lobe duct 208b. As further shown in FIG. 8, each of the long mixed air flow ducts 248b comprises a first end portion 249c connected or coupled to the intersection of the long third sidewall riser duct 240b and the second branch recirculation duct 244b, and each of the long mixed air flow ducts 248b comprises a second end portion 249d connected or coupled to each outboard manifold ducts 222, such as in the form of zone B first outboard manifold duct 222c.

The recirculated air flow 234 (see FIG. 8) in each first branch recirculation duct 244a mixes with the conditioned air flow 232 (see FIG. 8) from each short third sidewall riser duct 240a (see FIG. 8), to form the mixed air flow 236 (see FIG. 8) in each short mixed air flow duct 248a (see FIG. 8). The recirculated air flow 234 (see FIG. 8) in each second branch recirculation duct 244b mixes with the conditioned air flow 232 (see FIG. 8) from each long third sidewall riser duct 240b (see FIG. 8), to form the mixed air flow 236 (see FIG. 8) in each long mixed air flow ducts 248b (see FIG. 8).

As shown in FIG. 8, the air distribution system 200, such as in the form of zone B air distribution system 200b, further comprises the pair of outboard manifold ducts 222, such as in the form of zone B first outboard manifold duct 222c and zone B second outboard manifold duct 222d, coupled to the plurality of mixed air flow ducts 248. As shown in FIG. 8, the short mixed air flow ducts 248a are coupled to the zone B second outboard manifold duct 222d, and the long mixed air flow ducts 248b are coupled to the zone B first outboard manifold duct 222c. The pair of outboard manifold ducts 222 (see FIG. 8) each preferably connect to one or more hoses 218 (see FIG. 5), one or more nozzles 220 (see FIG. 5), and a plurality of air outlets 238 (see FIG. 5), including a plurality of personal air outlets (PAOs) 238a (see FIG. 5), to distribute the mixed air flow 236 (see FIGS. 5, 8, 9) into the cabin 22 (see FIGS. 5, 9).

As shown in FIG. 8, the air distribution system 200, such as in the form of zone B air distribution system 200b, further comprises air flow 230, such as a conditioned air flow 232, distributed from the one or more AC packs 29 (see FIG. 9), through the mix manifold 210 (see also FIG. 9), to the plurality of lower lobe ducts 208, such as the conditioned air flow lower lobe ducts 208b (see also FIG. 9), and then to the plurality of sidewall riser ducts 202, such as the third sidewall riser ducts 240 (see also FIG. 9).

As shown in FIG. 8, the air distribution system 200, such as in the form of zone B air distribution system 200b, further comprises air flow 230, such as a recirculated air flow 234, distributed from the recirculation air duct 212, such as the zone B recirculation air duct 212b, through the plurality of branch recirculation ducts 244, such as the first branch recirculation ducts 244a and second branch recirculation ducts 244b.

As shown in FIG. 8, the air distribution system 200, such as in the form of zone B air distribution system 200b, further comprises air flow 230, such as a mixed air flow 236 formed by mixing the conditioned air flow 232 and the recirculated air flow 234. The mixed air flow 236 is distributed to and through the pair of outboard manifold ducts 222, such as in the form of zone B first outboard manifold duct 222c and zone B second outboard manifold duct 222d, and into the cabin 22 (see FIG. 9) of the air vehicle 10 (see FIGS. 1, 5), such as an aircraft 10a (see FIGS. 1, 5).

In the embodiment of the air distribution system 200, such as in the form of zone B air distribution system 200b, shown in FIG. 8, the conditioned air flow 232 and the recirculated air flow 234 are mixed in one or more of the plurality of mixed air flow ducts 248, such as the short mixed air flow ducts 248a and the long mixed air flow ducts 248b, located in the crown portion 27 above the cabin floor 26 (see FIGS. 1, 5) of the cabin 22 (see FIGS. 1, 5, 9), to form the mixed air flow 236. The mixed air flow 236 (see FIG. 8) is distributed from one or more of the short mixed air flow ducts 248a (see FIG. 8) to the zone B second outboard manifold duct 222d (see FIG. 8), and from one or more of the long mixed air flow ducts 248b (see FIG. 8) to the zone B first outboard manifold duct 222c (see FIG. 8).

The air distribution system 200 (see FIG. 8), such as in the form of zone B air distribution system 200b (see FIG. 8), further preferably comprises a plurality of riser connector elements 224 (see FIG. 8) to connect the plurality of sidewall riser ducts 202, such as in the form of third sidewall riser ducts 240 (see FIG. 8), to the plurality of lower lobe ducts 208 (see FIG. 8), such as in the form of conditioned air flow lower lobe ducts 208b (see FIG. 8), and/or to connect the plurality of mixed air flow ducts 248 (see FIG. 8) to the pair of outboard manifold ducts 222 (see FIG. 8), such as in the form of zone B first outboard manifold duct 222c (see FIG. 8) and zone B second outboard manifold duct 222d (see FIG. 8).

The air distribution system 200 (see FIG. 8), such as in the form of zone B air distribution system 200b (see FIG. 8), may further comprises various known parts, such as valves (not shown), and other associated parts.

With this embodiment of the air distribution system 200, such as in the form of zone B air distribution system 200b, shown in FIG. 8, the need for crown mixing ducts 114 (see FIG. 4), crossover ducts 120 (see FIG. 4), and mufflers (not shown), is eliminated, as compared to the known air distribution system 100 (see FIG. 4), such as the known zone B air distribution system 100b (see FIG. 4), that requires crown mixing ducts 114 (see FIG. 4), crossover ducts 120 (see FIG. 4), and mufflers (not shown). Thus, the air distribution system 200 (see FIG. 8), such as in the form of zone B air distribution system, 200b (see FIG. 8), has a simplified system frame architecture 201b (see FIG. 8), which, in turn, results in an easier, more efficient, and faster assembly, has a reduced weight, and has a reduced part cost which, in turn, results in a reduced overall manufacturing cost.

Now referring to FIG. 9, FIG. 9 is a schematic illustration of another air flow scheme 250, such as in the form of air flow scheme 250b, using the air distribution system 200, such as in the form of zone B air distribution system 200b, of FIG. 8. As shown in FIG. 9, conditioned air flow 232 flows from the air conditioning pack 29 of the air conditioning system 28, through the mix manifold 210, and to the lower lobe ducts 208, such as the conditioned air flow lower lobe ducts 208b, and flows up the plurality of sidewall riser ducts 202, such as in the form of third sidewall riser ducts 240, including short third sidewall riser ducts 240a and long third sidewall riser ducts 240b.

As further shown in FIG. 9, recirculated air flow 234 flows from the crown 27 (see also FIG. 1) through the recirculation air duct 212, such as the zone B recirculation air duct 212b, through one or more branch recirculation ducts 244, such as first branch recirculation ducts 244a and second branch recirculation ducts 244b. The recirculated air flow 234 (see FIG. 9) in each first branch recirculation duct 244a mixes with the conditioned air flow 232 (see FIG. 9) from each short third sidewall riser duct 240a (see FIG. 9), to form the mixed air flow 236 (see FIG. 9) in each short mixed air flow duct 248a (see FIG. 9). The recirculated air flow 234 (see FIG. 9) in each second branch recirculation duct 244b mixes with the conditioned air flow 232 (see FIG. 9) from each long third sidewall riser duct 240b (see FIG. 9), to form the mixed air flow 236 (see FIG. 9) in each long mixed air flow ducts 248b (see FIG. 9).

As further shown in FIG. 9, the mixed air flow 236 in the mixed air flow duct 248, such as the short mixed air flow duct 248a flows to the outboard manifold duct 222, such as the zone B second outboard manifold duct 222d. As further shown in FIG. 9, the mixed air flow 236 in the mixed air flow duct 248, such as the long mixed air flow ducts 248b, flows to the outboard manifold duct 222, such as the zone B first outboard manifold duct 222c. The mixed air flow 236 (see FIG. 9) is distributed from the outboard manifold ducts 222 (see FIG. 9) to the cabin 22 (see FIG. 9), such as the second cabin area 22b (see FIG. 9) via hoses 218 (see FIG. 5) and nozzles 220 (see FIG. 5). The mixed air flow 236 (see FIG. 9) flows into the cabin 22 (see FIGS. 1, 5, 9) through air outlets 238 (see FIG. 5) around or near cabin stow bins 62 (see FIG. 5), through personal air outlets (PAOs) 238a (see FIG. 5), and/or through other suitable air outlets.

Figure 10:
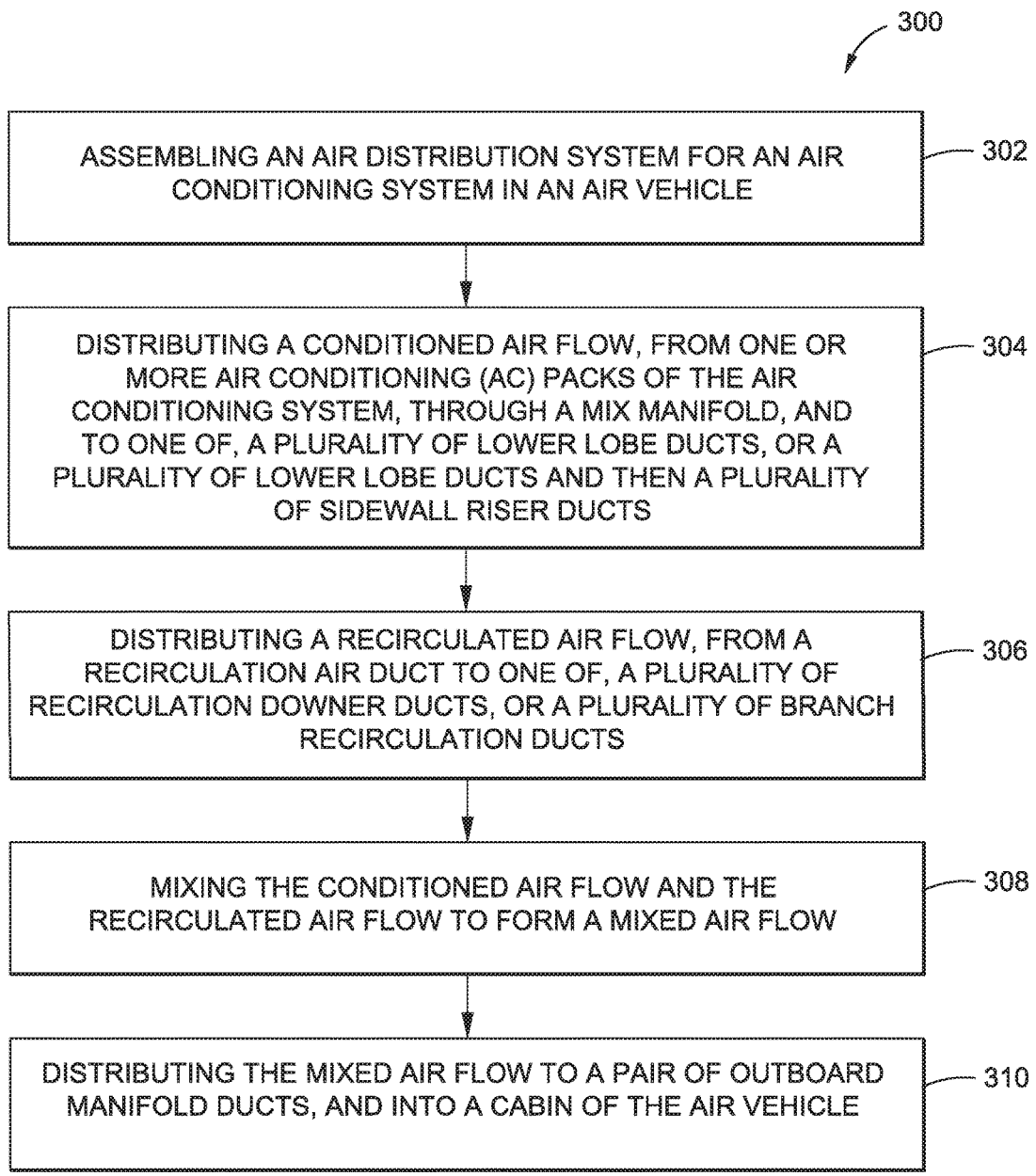
FIG. 10 is an illustration of a flow diagram showing an embodiment of a method of the disclosure.

Now referring to FIG. 10, FIG. 10 is an illustration of a flow diagram showing an embodiment of a method 300 of the disclosure. In this embodiment, there is provided the method 300 (see FIG. 10) for distributing air flows 230 (see FIG. 6) in an air vehicle 10 (see FIGS. 1, 5), such as an aircraft 10a (see FIGS. 1, 5).

As shown in FIG. 10, the method 300 comprises step 302 of assembling an air distribution system 200 (see FIGS. 5, 6, 8), such as in the form of a zone A air distribution system 200a (see FIG. 6) or a zone B air distribution system, 200b (see FIG. 8), for an air conditioning system 28 (see FIGS. 1, 5) in the air vehicle 10 (see FIGS. 1, 5), such as the aircraft 10a (see FIGS. 1, 5). The air distribution system (see FIGS. 5, 6, 8), such as in the form of zone A air distribution system 200a (see FIG. 6) or zone B air distribution system, 200b (see FIG. 8), distributes the air flows 230 (see FIG. 5), such as in the form of the conditioned air flow 232 (see FIG. 5), the recirculated air flow 234 (see FIG. 5), the mixed air flow 236 (see FIG. 5), or another suitable air flow 230 (see FIG. 5), in the air vehicle 10 (see FIGS. 1, 5), such as the aircraft 10a (see FIGS. 1, 5).

As discussed in detail above, the air distribution system 200 (see FIGS. 5, 6, 8), such as in the form of zone A air distribution system 200a (see FIG. 6) or zone B air distribution system, 200b (see FIG. 8), comprises a plurality of lower lobe ducts 208 (see FIGS. 5, 6, 8) located below the cabin floor 26 (see FIGS. 1, 5) of the cabin 22 (see FIGS. 1, 5) of the air vehicle 10 (see FIGS. 1, 5), such as the aircraft 10a (see FIGS. 1, 5). Each of the plurality of lower lobe ducts 208 (see FIGS. 5, 6, 8) is in fluid communication with the mix manifold 210 (see FIGS. 5, 6, 8) coupled to one or more air conditioning (AC) packs 29 (see FIGS. 1, 5, 7, 9) of the air conditioning system 28 (see FIGS. 1, 5, 7, 9) in the air vehicle 10 (see FIGS. 1, 5), such as the aircraft 10a (see FIGS. 1, 5).

The air distribution system 200 (see FIGS. 5, 6, 8), such as in the form of zone A air distribution system 200a (see FIG. 6) or zone B air distribution system, 200b (see FIG. 8), further comprises the plurality of sidewall riser ducts 202 coupled to the plurality of lower lobe ducts 208. The air distribution system (see FIGS. 5, 6, 8), such as in the form of zone A air distribution system 200a (see FIG. 6) or zone B air distribution system, 200b (see FIG. 8), further comprises the pair of outboard manifold ducts 222. The pair of outboard manifold ducts 222 may in one embodiment be coupled to the plurality of sidewall riser ducts 202 (see FIG. 6), or in another embodiment be coupled to the mixed air flow ducts 248 (see FIG. 8).

The air distribution system 200 (see FIGS. 5, 6, 8), such as in the form of zone A air distribution system 200a (see FIG. 6) or zone B air distribution system, 200b (see FIG. 8), further comprises the recirculation air duct 212 (see FIGS. 5, 6, 8) located in the crown portion 27 (see FIGS. 6, 8) of the air distribution system 200 above the cabin floor 26 (see FIGS. 1, 5).

The air distribution system 200 (see FIGS. 5, 6, 8), such as in the form of zone A air distribution system 200a (see FIG. 6) further comprises, in one embodiment, a plurality of recirculation downer ducts 226 (see FIGS. 5, 6) coupled between the recirculation air duct 212 (see FIGS. 5, 6) and the plurality of lower lobe ducts 208 (see FIGS. 5, 6). The air distribution system 200 (see FIGS. 5, 6, 8), such as in the form of zone B air distribution system 200b (see FIG. 6) further comprises, in another embodiment, a plurality of branch recirculation ducts 244 (see FIGS. 5, 8) coupled between the recirculation air duct 212 (see FIGS. 5, 6), and either the intersection of each of the plurality of short third sidewall riser ducts 240a (see FIGS. 5, 8) and each of the plurality of short mixed air flow ducts 248a (see FIGS. 5, 8), or the intersection of each of the plurality of long third sidewall riser ducts 240b (see FIGS. 5, 8) and each of the plurality of long mixed air flow ducts 248b (see FIGS. 5, 8).

The step 302 (see FIG. 10) of assembling the air distribution system 200 eliminates a need for crown mixing ducts 114 (see FIGS. 3, 4), crossover ducts 120 (see FIGS. 3, 4), and mufflers (not shown), as compared to known air distribution systems 100 (see FIGS. 3, 4), such as known zone A air distribution system 100a (see FIG. 3) and known zone B air distribution system 100b (see FIG. 4), that require crown mixing ducts 114 (see FIGS. 3, 4), crossover ducts 120 (see FIGS. 3, 4), and mufflers (not shown). Thus, the step 302 (see FIG. 10) of assembling results in the air distribution system 200 (see FIGS. 5, 6, 8), such as in the form of zone A air distribution system 200a (see FIG. 6) or zone B air distribution system, 200b (see FIG. 8), having a simplified system frame architecture 201a (see FIG. 6) or simplified system frame architecture 201b (see FIG. 8), which, in turn, results in an easier, more efficient, and faster assembly, having a reduced weight, and having a reduced part cost which, in turn, results in a reduced overall manufacturing cost.

As shown in FIG. 10, the method 300 further comprises step 304 of distributing a conditioned air flow 232 (see FIGS. 6-9), from the one or more AC packs 29 (see FIGS. 7, 9), through the mix manifold 210 (see FIGS. 6, 7, 9), and to one of, the plurality of lower lobe ducts 208 (see FIGS. 6, 7), or the plurality of lower lobe ducts 208 (see FIGS. 8, 9) and then the plurality of sidewall riser ducts 202 (see FIGS. 8, 9), such as third sidewall riser ducts 240 (see FIGS. 8, 9).

As shown in FIG. 10, the method 300 further comprises step 306 of distributing a recirculated air flow 234 (see FIGS. 6-9), from the recirculation air duct 212 (see FIGS. 6-9), to one of, a plurality of recirculation downer ducts 226 (see FIGS. 6, 7), or to a, plurality of branch recirculation ducts 244 (see FIGS. 8, 9). The plurality of branch recirculation ducts 244 (see FIG. 8) comprise first branch recirculation ducts 244a (see FIG. 8) and second branch recirculation ducts 244b (see FIG. 8).

As shown in FIG. 10, the method 300 further comprises step 308 of mixing the conditioned air flow 232 (see FIGS. 6-9) and the recirculated air flow 234 (see FIGS. 6-9) to form a mixed air flow 236 (see FIGS. 6-9). In one embodiment, as shown in FIGS. 6, 7, the step 308 of mixing of the method 300 (see FIG. 10) comprises mixing the conditioned air flow 232 and the recirculated air flow 234 in the plurality of lower lobe ducts 208 located below the cabin floor 26 (see FIGS. 1, 5) of the cabin 22 (see FIGS. 1, 6, 7), to form the mixed air flow 236. In another embodiment, as shown in FIGS. 8, 9, the step 308 of mixing of the method 300 (see FIG. 10) comprises mixing the conditioned air flow 232 and the recirculated air flow 234 in one or more of the plurality of mixed air flow ducts 248 (see FIG. 8), such as short mixed air flow ducts 248a and long mixed air flow ducts 248b (see FIG. 8), located in the crown portion 27 (see FIGS. 1, 8, 9) above the cabin floor 26 (see FIGS. 1, 5) of the cabin 22 (see FIGS. 1, 9), to form the mixed air flow 236.

As shown in FIG. 10, the method 300 further comprises step 310 of distributing the mixed air flow 236 (see FIGS. 6-9) comprises distributing the mixed air flow 236 to or through the pair of outboard manifold ducts 222 (see FIGS. 6-9), and into the cabin 22 (see FIGS. 6, 7, 9) of the air vehicle 10 (see FIGS. 1, 5), such as the aircraft 10a (see FIGS. 1, 5). In one embodiment, as shown in FIGS. 6, 7, the step 310 of distributing the mixed air flow 236 of the method 300 (see FIG. 10) comprises distributing the mixed air flow 236 from the plurality of lower lobe ducts 208 to the pair of outboard manifold ducts 222 and into the cabin 22, via the plurality of sidewall riser ducts 202 comprising short first sidewall riser ducts 204a and long first sidewall riser ducts 204b. In another embodiment, as shown in FIGS. 8, 9, the step 310 of distributing the mixed air flow 236 comprises distributing the mixed air flow 236 from one or more of the plurality of mixed air flow ducts 248 comprising short mixed air flow ducts 248a and long mixed air flow ducts 248b, to the pair of outboard manifold ducts 222, and into the cabin 22.

Disclosed embodiments of the air distribution system 200 (see FIGS. 5, 6, 8), such as in the form of zone A air distribution system 200a (see FIG. 6) and zone B air distribution system 200b (see FIG. 8), and method 300 (see FIG. 10) eliminate the need for crown mixing ducts 114 (see FIGS. 3, 4), crossover ducts 120 (see FIGS. 3, 4), mufflers (not shown), and other unnecessary associated parts and pieces, as compared to the known air distribution system 100 (see FIGS. 3, 4), such as the known zone A air distribution system 100a (see FIG. 3) and the known zone B air distribution system 100b (see FIG. 4), that require crown mixing ducts 114 (see FIGS. 3, 4), crossover ducts 120 (see FIGS. 3, 4), and mufflers (not shown), and other associated parts. Thus, the air distribution system 200 (see FIGS. 5, 6, 8), such as in the form of zone A air distribution system 200a (see FIG. 6) and zone B air distribution system 200b (see FIG. 8), and method 300 (see FIG. 10) provide for a simplified system frame architecture 201a (see FIG. 6) and simplified system frame architecture 201b (see FIG. 8), which, in turn, result in an easier, more efficient, and faster assembly, provide a reduced weight because less heavy parts are used, and provide a reduced part cost which, in turn, results in a reduced overall manufacturing cost.

In addition, disclosed embodiments of the air distribution system 200 (see FIGS. 5, 6, 8), such as in the form of zone A air distribution system 200a (see FIG. 6), and method 300 (see FIG. 10) mix the recirculated air flow 234 (see FIG. 7) and the conditioned air flow (outside air flow) 234 (see FIG. 7) below the cabin floor 26 (see FIGS. 1, 5) in the lower lobe ducts 208 (see FIG. 7), and connect the sidewall riser ducts 202 (see FIG. 7), such as the first sidewall riser ducts 204 (see FIG. 7), directly to the outboard manifold ducts 222 (see FIG. 7), thus eliminating the need for the crown mixing ducts 114 (see FIG. 3), such as four (4) crown mixing ducts 114 (see FIG. 3), and the crossover ducts 120 (see FIG. 3), such as four (4) crossover ducts 120 (see FIG. 3), that carry the mixed air flow 136 (see FIG. 3) back to the outboard manifold ducts 122 (see FIG. 3). Thus, the air distribution system 200 (see FIGS. 5, 6, 8), such as in the form of zone A air distribution system 200a (see FIG. 6), and method 300 (see FIG. 10), allow for changing the location of the mixing of the conditioned air flow 232 (see FIG. 6) with the recirculated air flow 234 (see FIG. 6) below the cabin floor 26 (see FIGS. 1, 5), which, in turn, enable the reduction of multiple ducts in the crown portion 27 (see FIG. 1) of the air vehicle 10 (see FIG. 1), such as the aircraft 10a (see FIG. 1).

Moreover, disclosed embodiments of the air distribution system 200 (see FIGS. 5, 6, 8), such as in the form of zone A air distribution system 200a (see FIG. 6) and zone B air distribution system 200b (see FIG. 8), and method 300 (see FIG. 10) simplify the build process, simplify the system frame architectures 201a, 201b (see FIG. 5), use less complex and heavy parts, and improve build ergonomics and safety by reducing the amount of ducts needed to be built and assembled, and in particular, needed to be built and assembled with overhead build and assembly processes. Decreasing the amount of overhead build and assembly, may, in turn, decrease the risk of build ergonomics and safety issues.

In particular, disclosed embodiments of the air distribution system 200 (see FIGS. 5, 6, 8), such as in the form of zone A air distribution system 200a (see FIG. 6) and zone B air distribution system 200b (see FIG. 8), and method 300 (see FIG. 10) are suitable for use in aircraft having sidewall riser ducts 202 (see FIGS. 6, 8) that are distributed or spread out and that do not require removal of aircraft windows when installed or assembled. For example, an aircraft that uses distributed sidewall riser ducts includes the Boeing 787 aircraft. However, disclosed embodiments of the air distribution system 200 (see FIGS. 5, 6, 8), such as in the form of zone A air distribution system 200a (see FIG. 6) and zone B air distribution system 200b (see FIG. 8), may also be used with other suitable wide-body, high capacity passenger or commercial aircraft, preferably with distributed sidewall riser ducts.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An air distribution system for an air conditioning system in an air vehicle, the air distribution system comprising:
   a plurality of lower lobe ducts located below a cabin floor of a cabin of the air vehicle, each of the plurality of lower lobe ducts being in fluid communication with a mix manifold coupled to one or more air conditioning (AC) packs of the air conditioning system in the air vehicle;
   a plurality of sidewall riser ducts coupled to the plurality of lower lobe ducts;
   a pair of outboard manifold ducts;
   a recirculation air duct located in a crown portion of the air distribution system above the cabin floor;
   one of, a plurality of recirculation downer ducts, or a plurality of branch recirculation ducts, coupled to the recirculation air duct;
   a conditioned air flow, distributed from the one or more AC packs, through the mix manifold, and to one of, the plurality of lower lobe ducts, or the plurality of lower lobe ducts and then the plurality of sidewall riser ducts;
   a recirculated air flow, distributed from the recirculation air duct, to one of, the plurality of recirculation downer ducts, or the plurality of branch recirculation ducts; and
   a mixed air flow formed by mixing the conditioned air flow and the recirculated air flow, the mixed air flow distributed to the pair of outboard manifold ducts, and into the cabin of the air vehicle.

2. The air distribution system of claim 1 wherein the conditioned air flow and the recirculated air flow are mixed in the plurality of lower lobe ducts located below the cabin floor of the cabin, to form the mixed air flow.

3. The air distribution system of claim 2 wherein the plurality of sidewall riser ducts comprise short first sidewall riser ducts and long first sidewall riser ducts, and further wherein the mixed air flow is distributed from the plurality of lower lobe ducts to the pair of outboard manifold ducts, via the short first sidewall riser ducts and the long first sidewall riser ducts.

4. The air distribution system of claim 1 wherein the conditioned air flow and the recirculated air flow are mixed in one or more of a plurality of mixed air flow ducts located in the crown portion above the cabin floor of the cabin, to form the mixed air flow.

5. The air distribution system of claim 4 wherein the plurality of mixed air flow ducts comprise short mixed air flow riser ducts and long mixed air flow ducts, and further wherein the mixed air flow is distributed from one or more of the short mixed air flow ducts and one or more of the long mixed air flow ducts, to the pair of outboard manifold ducts.

6. The air distribution system of claim 1 wherein the pair of outboard manifold ducts each connect to one or more hoses, one or more nozzles, and a plurality of air outlets, including a plurality of personal air outlets (PAOs), to distribute the mixed air flow into the cabin.

7. The air distribution system of claim 1 further comprising a plurality of riser connector elements to connect the plurality of sidewall riser ducts to the pair of outboard manifold ducts, and to the plurality of lower lobe ducts.

8. The air distribution system of claim 1 wherein the air distribution system eliminates a need for crown mixing ducts and crossover ducts, as compared to a known air distribution system requiring crown mixing ducts and crossover ducts, thus resulting in a simplified, decreased weight, air distribution system.

9. An aircraft comprising:
   a fuselage;
   at least one wing connected to the fuselage;
   a cabin located within the fuselage, the cabin having a cabin floor;
   an environmental control system (ECS) coupled to the cabin, the ECS comprising an air conditioning system and an air distribution system, the air conditioning system having at least one or more air conditioning (AC) packs, an air cycle machine (ACM), and one or more heat exchangers, the air distribution system comprising:
   a plurality of lower lobe ducts located below the cabin floor, each of the plurality of lower lobe ducts being in fluid communication with a mix manifold coupled to the one or more air conditioning (AC) packs;
   a plurality of sidewall riser ducts coupled to the plurality of lower lobe ducts;
   a pair of outboard manifold ducts coupled to one of, the plurality of sidewall riser ducts, or a plurality of mixed air flow ducts;
   a recirculation air duct located in a crown portion of the air distribution system above the cabin floor;
   one of, a plurality of recirculation downer ducts, or a plurality of branch recirculation ducts, coupled to the recirculation air duct;
   a conditioned air flow, distributed from the one or more AC packs, through the mix manifold, and to one of, the plurality of lower lobe ducts, or the plurality of lower lobe ducts and then the plurality of sidewall riser ducts;

a recirculated air flow, distributed from the recirculation air duct to one of, the plurality of recirculation downer ducts, or the plurality of branch recirculation ducts; and a mixed air flow formed by mixing the conditioned air flow and the recirculated air flow, the mixed air flow distributed to the one or more outboard manifold ducts, and into the cabin of the aircraft.

10. The aircraft of claim 9 wherein the environmental control system (ECS) further comprises a control system with one or more controllers to control distribution and flow of the conditioned air flow, the recirculated air flow, and the mixed air flow through the air distribution system, and wherein the ECS further comprises a power system to provide power to run the ECS.

11. The aircraft of claim 9 wherein the conditioned air flow and the recirculated air flow of the air distribution system are mixed in the plurality of lower lobe ducts located below the cabin floor of the cabin, to form the mixed air flow.

12. The aircraft of claim 11 wherein the plurality of sidewall riser ducts of the air distribution system comprise short first sidewall riser ducts and long first sidewall riser ducts, and further wherein the mixed air flow is distributed from the plurality of lower lobe ducts to the pair of outboard manifold ducts, via the short first sidewall riser ducts and the long first sidewall riser ducts.

13. The aircraft of claim 9 wherein the conditioned air flow and the recirculated air flow of the air distribution system are mixed in one or more of the plurality of mixed air flow ducts located in the crown portion above the cabin floor of the cabin, to form the mixed air flow.

14. The aircraft of claim 13 wherein the plurality of mixed air flow ducts of the air distribution system comprise short mixed air flow ducts and long mixed air flow ducts, and further wherein the mixed air flow is distributed from one or more of the short mixed air flow ducts and one or more of the long third sidewall riser ducts, to the pair of outboard manifold ducts.

15. The aircraft of claim 9 wherein the pair of outboard manifold ducts each connect to one or more hoses, one or more nozzles, and a plurality of air outlets, including a plurality of personal air outlets (PAOs), to distribute the mixed air flow into the cabin.

16. A method for distributing air flows in an air vehicle, the method comprising the steps of:
assembling an air distribution system for an air conditioning system in the air vehicle, the air distribution system distributing the air flows in the air vehicle, the air distribution system comprising:
a plurality of lower lobe ducts located below a cabin floor of a cabin of the air vehicle, each of the plurality of lower lobe ducts being in fluid communication with a mix manifold coupled to one or more air conditioning (AC) packs of the air conditioning system in the air vehicle;
a plurality of sidewall riser ducts coupled to the plurality of lower lobe ducts;
a pair of outboard manifold ducts;
a recirculation air duct located in a crown portion of the air distribution system above the cabin floor; and
one of, a plurality of recirculation downer ducts, or a plurality of branch recirculation ducts, coupled to the recirculation air duct;

distributing a conditioned air flow, from the one or more AC packs, through the mix manifold, and to one of, the plurality of lower lobe ducts, or the plurality of lower lobe ducts and then the plurality of sidewall riser ducts;

distributing a recirculated air flow, from the recirculation air duct to one of, the plurality of recirculation downer ducts, or the plurality of branch recirculation ducts;

mixing the conditioned air flow and the recirculated air flow to form a mixed air flow; and distributing the mixed air flow to the pair of outboard manifold ducts, and into the cabin of the air vehicle.

17. The method of claim 16 wherein the mixing comprises mixing the conditioned air flow and the recirculated air flow in the plurality of lower lobe ducts located below the cabin floor of the cabin, to form the mixed air flow.

18. The method of claim 17 wherein distributing the mixed air flow comprises distributing the mixed air flow from the plurality of lower lobe ducts to the pair of outboard manifold ducts and into the cabin, via the plurality of sidewall riser ducts comprising short first sidewall riser ducts and long first sidewall riser ducts.

19. The method of claim 16 wherein the mixing comprises mixing the conditioned air flow and the recirculated air flow in one or more of a plurality of mixed air flow ducts located in the crown portion above the cabin floor of the cabin, to form the mixed air flow.

20. The method of claim 19 wherein distributing the mixed air flow comprises distributing the mixed air flow from one or more of the plurality of mixed air flow ducts comprising short mixed air flow ducts and long mixed air flow ducts, to the pair of outboard manifold ducts, and into the cabin.

21. The method of claim 16 wherein the assembling of the air distribution system eliminates a need for crown mixing ducts and crossover ducts, as compared to a known air distribution system requiring crown mixing ducts and crossover ducts, thus the assembling results in a simplified, decreased weight, air distribution system.

* * * * *